United States Patent
Ishii et al.

(10) Patent No.: US 10,924,989 B2
(45) Date of Patent: Feb. 16, 2021

(54) COMMUNICATION SYSTEM, COMMUNICATION APPARATUS, COMMUNICATION METHOD, TERMINAL, AND NON-TRANSITORY MEDIUM

(71) Applicant: NEC CORPORATION, Tokyo (JP)

(72) Inventors: Satoru Ishii, Tokyo (JP); Hideo Hasegawa, Tokyo (JP); Shintaro Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/747,323

(22) PCT Filed: Aug. 3, 2016

(86) PCT No.: PCT/JP2016/072782
§ 371 (c)(1),
(2) Date: Jan. 24, 2018

(87) PCT Pub. No.: WO2017/022791
PCT Pub. Date: Feb. 9, 2017

(65) Prior Publication Data
US 2018/0213472 A1    Jul. 26, 2018

(30) Foreign Application Priority Data

Aug. 4, 2015 (JP) .............................. JP2015-154492

(51) Int. Cl.
*H04W 48/18* (2009.01)
*H04W 4/24* (2018.01)
(Continued)

(52) U.S. Cl.
CPC ............. *H04W 48/18* (2013.01); *H04L 12/66* (2013.01); *H04M 3/00* (2013.01); *H04W 4/00* (2013.01);
(Continued)

(58) Field of Classification Search
CPC .. H04W 24/02; H04W 88/16; H04L 12/4641; H04L 61/1588; H04L 12/66; H04L 45/586
See application file for complete search history.

(56) References Cited

U.S. PATENT DOCUMENTS

2014/0259012 A1* 9/2014 Nandlall ................. H04W 8/02
                                                                   718/1
2015/0124622 A1  5/2015 Kovvali et al.
(Continued)

FOREIGN PATENT DOCUMENTS

JP   2008-28751 A   2/2008
JP   2012-49787 A   3/2012
(Continued)

OTHER PUBLICATIONS

Communication dated Jun. 1, 2018 from the European Patent Office in counterpart European application No. 16833070.2.
(Continued)

*Primary Examiner* — Jung H Park
(74) *Attorney, Agent, or Firm* — Sughrue Mion, PLLC

(57) ABSTRACT

A data center adapted to connect via a first wide area network to a core network connected with a base station and to a wireless LAN, variably controls service provided in a virtual core network of the data center to a terminal enabled to select connection to either a wireless LAN or a base station and connect to the data center.

16 Claims, 13 Drawing Sheets

(51) Int. Cl.
  *H04M 3/00* (2006.01)
  *H04W 4/00* (2018.01)
  *H04L 12/66* (2006.01)
  *H04W 8/18* (2009.01)
  *H04W 92/02* (2009.01)
  *H04W 88/06* (2009.01)
  *H04M 15/00* (2006.01)

(52) U.S. Cl.
  CPC .............. *H04W 4/24* (2013.01); *H04W 8/18* (2013.01); *H04M 15/81* (2013.01); *H04W 88/06* (2013.01); *H04W 92/02* (2013.01)

(56) References Cited

U.S. PATENT DOCUMENTS

| 2015/0173111 A1* | 6/2015 | Agarwal | H04W 8/04 370/329 |
| 2015/0208336 A1 | 7/2015 | Iihoshi et al. | |
| 2016/0285746 A1* | 9/2016 | Parron | H04L 45/245 |
| 2017/0013513 A1* | 1/2017 | Agarwal | H04W 36/22 |

FOREIGN PATENT DOCUMENTS

| JP | 2014-195167 A | 10/2014 |
| WO | 2009151480 A1 | 12/2009 |
| WO | 2015106822 A1 | 7/2015 |

OTHER PUBLICATIONS

Next-generation Wi-Fi Calling Using IMS and 3GPP Wi-Fi Access, 2 pages, Internet search (searched on Apr. 26, 2015) <URL: http://www.aptilo.com/wi-fi-calling/ next-generation-wi-fi-calling-solution>.
International Search Report for PCT/JP2016/072782 dated Oct. 25, 2016 [PCT/ISA/210].

* cited by examiner

FIG. 3A

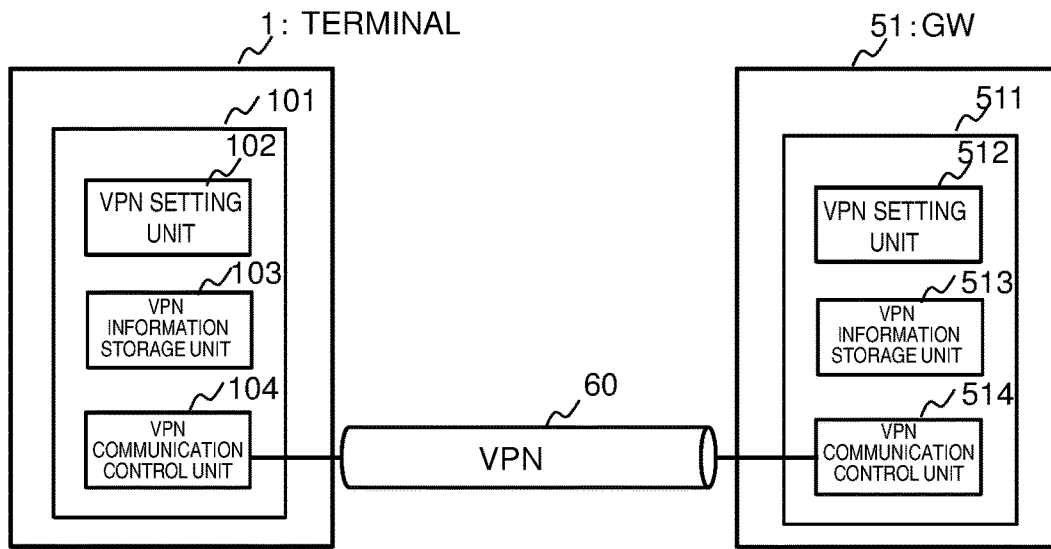

FIG. 3B

| VPN ID | CONNECTION DST ADDRESS | TERMINAL ID/NAME | PRE-SHARED KEY | APPARATUS ADDRESS | AUTHENTICATION ALGORITHM | ENCRYPTION ALGORITHM | CONNECTION NETWORK | NAT TRAVERSAL | ... |
|---|---|---|---|---|---|---|---|---|---|
| VPN1 | 100.1.100.1 | smart1 | secret1 | 100.1.1.1 | SHA-1 | AES | 100.1.100.1/32 | PRESENT | |
| VPN2 | 100.1.100.2 | smart2 | secret2 | 100.1.1.1 | SHA-1 | DES | 100.1.100.2/32 | PRESENT | |
| VPN3 | 100.1.100.3 | smart3 | secret3 | 100.1.1.1 | SHA-1 | 3DES | 100.1.100.3/32 | PRESENT | |
| ⋮ | | | | | | | | | |

FIG. 3C

| VPN ID | CONNECTION DST GW ADDRESS | CONNECTION DST GW NAME | PRE-SHARED KEY | CLIENT ADDRESS | AUTHENTICATION ALGORITHM | ENCRYPTION ALGORITHM | CONNECTION NETWORK | NAT TRAVERSAL | ... |
|---|---|---|---|---|---|---|---|---|---|
| VPN1 | 100.1.1.1 | example.dc.com | secret1 | 100.1.100.1 | SHA-1 | DES | 100.1.1.0/24 | PRESENT | |

| FILTER ID | TYPE | DIRECTION | PROTOCOL | SOURCE ADDRESS | TRANSMISSION PORT | DESTINATION ADDRESS | DESTINATION PORT |
|---|---|---|---|---|---|---|---|
| 1 | DISCARD | DOWN | TCP/UDP | * | 23 | GW1 | * |
| 2 | DISCARD | DOWN | UDP | xxx.* | * | PRIVATE IP ADDRESS OF TERMINAL 1 | * |
| 3 | DISCARD | UP | TCP/UDP | PRIVATE IP ADDRESS OF TERMINAL 1 | * | YYY | * |
| ⋮ | | | | | | | |

| Wi-Fi COMMUNICATON | ON |
|---|---|
| Wi-Fi TELEPHONE | ON |

COMMUNICATION SYSTEM, COMMUNICATION APPARATUS, COMMUNICATION METHOD, TERMINAL, AND NON-TRANSITORY MEDIUM

CROSS REFERENCE TO RELATED APPLICATIONS

This application is a National Stage of International Application No. PCT/JP2016/072782, filed on Aug. 3, 2016, which claims priority from Japanese Patent Application No. 2015-154492, filed on Aug. 4, 2015, the contents of all of which are incorporated herein by reference in their entirety.

FIELD

The present invention relates to a communication system, a communication apparatus, a communication method, a terminal, and non-transitory medium storing a program.

BACKGROUND

Description of Related Application

The present invention is based on the priority of the Japanese Patent Application: Japanese Patent Application No. 2015-154492 (filed on Aug. 4, 2015), the entire contents of which are incorporated by reference in this application with citation.

Evolved Packet System(EPS) includes 3GPP (3rd Generation Partnership Project) access network as well as non-3GPP access network. The 3GPP access network includes UTRAN (UMTS (Universal Mobile Tel System) Terrestrial Radio Access Network), E-UTRAN (Evolved UTRAN), GERAN (GSM (Registered Trademark) (Global system for mobile communications) (EDGE Radio Access Network) and so forth.

The Non-3GPP access network is an IP (Internet Protocol) access network using an access technology with specifications outside a scope of 3GPP. The Non-3GPP access network includes a Wi-Fi (Wireless Fidelity) network (registered trademark: Wireless Fidelity) specified by the IEEE (Institute of Electrical and Electronics Engineers, Inc.) 802.11x standard and a wireless LAN (Wireless Local Area Network: WLAN) such as WiMAX (Worldwide Interoperability for Microwave Access) specified by the IEEE 802.16 standard. For non-3GPP access, for example, reference may be made to 3GPP TS 23.402: Architecture enhancements for non-3 GPP accesses, or the like.

Wi-Fi (registered trademark)-Calling is a Voice over IP (VoIP) service provided on a Wi-Fi (registered trademark) network by communication carrier (operator). For example, a terminal (User Equipment (UE)) into which a SIM (Subscriber Identity Module) of a communication carrier is inserted is connected to a security gateway of the communication carrier via a Wi-Fi (registered trademark) network, and when authenticated with SIM authentication by the security gateway, the terminal (User Equipment (UE)) is connected to an exchange node of a core network (Evolved Packet Core: EPC), thereby making it possible for the terminal to use a voice call service based on a telephone number and Short Message Service (SMS), etc., each provided by the communication carrier (Non-Patent Literature 1). Further, when the terminal is connected to Wi-Fi (registered trademark) and Wi Fi (registered trademark)-Calling is set on in the terminal, the security gateway, on reception of an incoming call to the terminal calls the terminal via a Wi-Fi (registered trademark) network.

FIG. 1 is a diagram illustrating an EPS including a non-3GPP access network. A terminal (UE) 1 such as a smartphone can connect to a packet data network (PDN) 30 via a base station (evolved Node B: eNB) 10 of a communication carrier and an EPC 20, or can connect to the Internet via a wireless LAN such as a Wi-Fi (registered trademark).

An MME (Mobility Management Entity) 23 of EPC 20 performs various processing such as mobility management and authentication of the terminal 1, setting of a user data transfer route, and the like. In addition, the MME 23 performs user authentication, or the like, in cooperation with an HSS 24 (Home Subscriber Server which holds subscriber profile). The MME 23 establishes/releases a user data transfer route in a section (S1-U) from an SGW (Serving Gateway) 21 to the base station 10. The SGW 21 exchanges user data with the base station 10, for example, and establishes/releases a communication path between the SGW 21 and a POW (Packet Data Network) PDN 22.

The PGW 22 is connected to a packet data network (PDN) 30 such as IMS (Internet Multimedia Subsystem) or the Internet, for example.

Further, the PGW 22 performs, for example, allocation of an IP address (private IP address) to the terminal 1, packet filtering for a user, charging support, lawful interception, packet screening, and so forth.

A PCRF (Policy and Charging Rules Function) 26 determines a policy control such as QoS (Quality of Service) and a charging control rule. Based on notification information from the PCRF 26, the PGW 22 and SGW 21 perform policy control, on a per packet basis, for example.

A PCEF (Policy and Charge Enforcement Function) (not shown), which is connected to the PCRF 26 via a Gx interface, is a policy and charging function node in a communication network, and is arranged, for example, in the PGW 22.

In FIG. 1, a line S11 or the like between respective nodes represents an interface, a broken line represents a control plane (C-Plane), and a solid line represents a signal (data) of a user plane (U-Plane). For details of the EPC, reference may be made to, for example, 3GPP TS 23.401: GPRS Enhancements for E-UT RAN Access or the like.

Regarding a packet filter in the PGW 22, a terminal (UE) 1 sets traffic flow templates (TFTs) of EPS bearers managed by the PGW 22, for example, by using a UE requester bearer resource modification procedure. In the PGW 22, the packet filter is managed to be distinguished between uplink (UL) and downlink (DL), for example.

In a bearer modification (UE requested bearer resource modification) according to a request from the terminal (UE) 1, the terminal 1 transmits, for example, a bearer resource modification request (Request Bearer Resource Modification) to the MME 23 via the base station (eNB). The bearer resource modification request includes, for example, a request (TAD (Traffic Aggregate Description)) such as addition, modification, deletion or the like of a packet filter in the PGW 22. In a case of addition, the bearer resource modification request includes packet filter information to be added. The MME 23 transmits a bearer resource command to the PGW 22 via the SGW 21, and the PGW 22 interacts with the PCRF 26, for example, to determine PCC (Policy and Charging Control) (PCEF Initiated IP-CAN (IP Connectivity Access Network) Session Modification) (e.g. see 3GPP TS 23.203: Policy and charging control architecture etc.).

The PGW 22 provides, for example, content of the TAD and a GBR (Guaranteed Bit Rate) change related to packet filter information included in the TAD to the PCRF 26. When the request is accepted, the PGW 22 inserts, modifies, or deletes one or more packet filters in TFT of an EPS bearer corresponding to the TAD.

In Wi-Fi (registered trademark)-Calling, etc., a call request from the terminal 1 is forwarded, as an Un-Trusted Access (unreliable access), via a wireless LAN access point 41 and via an ePDG (evolved packet data gateway) 27 of a communication carrier to the PGW 22, and is then connected to PDN 30 (for example, EMS service).

The ePDG 27 is an IPsec gateway that terminates an IPsec (Security Architecture for Internet Protocol) connection from a mobile interface (Swu). When the terminal (UE) 1 switches to a non-3GPP access that is not trusted in security, or the terminal (UE) 1 first connects to a non-3GPP access, the terminal 1 detects an ePDG 27 and performs key exchange (IKEv 2) with the ePDG 27, and establishment of an IPsec tunnel, and then establishes a PDN (Packet Data Network) connection with the PGW 22 over the established IPsec tunnel. In order for the terminal 1 to access the non-3GPP access network, it is necessary to perform authentication. The ePDG 27 relays an EAP (Extensible Authentication Protocol) message from the terminal 1 to a 3GPP AAA (Authentication Authorization Accounting) server 25. The 3GPP AAA server 25 performs EAP-SIM (Extensible Authentication Protocol-Subscriber Identity Module) Authentication, or EAP-AKA (Extensible Authentication Protocol-Authentication and Key Agreement) authentication (reference may be made to 3GPP TS 33.402: Security aspects of non-3GPP accesses, etc., for example).

The ePDG 27 sets up a tunnel (Proxy Mobile IP or GPRS (General Packet Radio System) Tunneling Protocol) toward the PGW 22 in S2b interface (reference may be made to 3 GPP TR 23.834: Study on GPRS Tunneling Protocol (GTP) based S2b etc., for example).

When the non-3GPP access corresponds to PMIPv6 (Proxy Mobile IPv6), it can connect to the PGW 22 via a PMIPv6. In the case of using a proxy mobile IP between the PGW 22 and the ePDG 27, when an IPsec tunnel is established between the terminal 1 and the ePDG 27, the ePDG 27 transmits a proxy binding update message to the PGW 22. As a result, in the PGW 22, a transmission destination of data to the terminal 1 is switched to the ePDG 27. It is noted that the PMIPv6 is a mobility control protocol that establishes and releases a tunnel for data transfer (GRE (Generic Routing Encapsulation) tunnel) between a mobility anchor (LMA: Local Mobility Anchor) and a mobility access gateway (MAG: Mobility Access Gateway) (reference may be made to IETF (The Internet Engineering Task Force) RFC (Request For Comments) 5213). The LMA forwards a packet to the MAG to which the terminal is connected (switches a communication route and forwards the packet addressed to the terminal to a visiting area). When the terminal moves from one MAG to another MAG, a tunnel for data transfer is established between the LMA that established the data transfer tunnel before, and a MAG to which the terminal newly connects.

The 3GPP AAA server 25 provides network access authentication, authorization, and accounting services from users. Authorization of non-3GPP access is performed among terminal 1, 3 GPP AAA server 25, and HSS 24. For example, when the terminal 1 establishes an IPsec tunnel with the ePDG 27, mutual authentication is performed between the terminal 1 and the network based on, for example, EAP-AKA.

When the terminal 1 moves or first connects to the trusted non-3GPP access (trusted wireless LAN access point 42 in FIG. 1), the MW (Mobile IP) tunnel (S2a, DSMIPv 6 (Dual-Stack MIPv 6): reference may be made to IETF RFC 5555) directly to the PGW 22. As for ePDG and 3GPP AAA server, reference may be made, for example, to 3GPP TS 29.273: Evolved Packet System (EPS); 3GPP EPS AAA interfaces or the like. Whether the non-3GPP access network is a trusted access network or an untrusted access network is determined by, for example, a communication carrier (operator) of a HPLMN (Home Public Land Mobile Network) to which a subscriber is registered.

IPSec is a protocol that encrypts and authenticates packets at a network layer level. AH (Authentication Header) performs authentication of such as connection destination of a VPN (Virtual Private Network), presence or absence of tampering in a packet (reference may be made to IETF RFC 2402). ESP (Encapsulating Security Payload) performs packet encryption and authentication (connection destination/packet falsification) (reference may be made to IETF RFC 2406), For IPSec communication, there are a transport mode (IPsec between hosts on which IPsec is implemented) and a tunnel mode (IPsec between VPN apparatuses such as routers equipped with IPsec). In the transport mode, data of layer 4 or more of a packet is encrypted (see FIG. 13B), and the packet is forwarded based on an original IP header (Original IP header). In the tunnel mode, an original IP header and data part (FIG. 13A) of a packet are encrypted and a new IP header (New IP header) is added (see FIG. 13C).

An ESP packet has a format including an ESP header, a payload, an ESP trailer, and authentication data (ESP Authentication data) (see FIG. 13B and FIG. 13C).

The ESP header (ESP header) includes an SPI (Security Parameter Index: a 32-bit value uniquely identifying an SA (Security Association) for that datagram), and a sequence number (sequence number of the packet: 32 bits).

The ESP trailer includes a padding (padding field for adjusting payload length), a pad length (number of bytes of padding), a next header (Protocol after ESP: TCP (Transmission Control Protocol)/UDP (User Datagram Protocol)).

Authentication data (HMAC (Hash-based Message Authentication Code)) is a variable length field including an Integrity Check Value (ICV) calculated from an ESP packet except authentication data.

A security association (SA), which is a logical connection, is established between VPN apparatuses for performing IPsec communication. Since SA is a one-way tunnel, two SAs are provided for transmission and reception of packets. SA is established for each traffic that performs VPN communication. SA includes IPsec parameters (security information) (e.g., SPI (Security Parameter Index), mode, protocol, cryptographic algorithm, key, authentication algorithm, IP address of tunnel endpoint, etc.).

IKE (Internet Key Exchange) is a key exchange protocol for SA setting (reference may be made to IETF RFC 4306, for example). ISAKMP (Internet Security Association and Key Management Protocol)_SA (Security Association) is an SA for encrypting control information of IKE for transmission and reception between peers (reference may be made to IETF RFC 4306, for example).

Recently, as a form of a telecommunication business, an MVNO (Mobile Virtual Network Operator) that borrows necessary infrastructures from an MNO (Mobile Network Operator) which is a communication carrier (carrier) possessing communication infrastructures such as wireless communication facilities and core networks) is widespread. In this specification, MVNO communication carriers are referred to as MVNO carriers. A terminal contracted to an MVNO carrier is composed of, for example, a SIM (Subscriber Identity Module) free terminal. In this specification, an MNO is also referred to as an MNO carrier.

Non-Patent Literature 1

Next-generation Wi-Fi Calling Using IMS and 3GPP Wi-Fi Access, Internet search (searched on 26 Apr. 2015) <URL: http://www.aptilo.com/wi-fi-calling/next-generation-wi-fi-calling-solution>

SUMMARY

In a data center or the like, a mechanism for providing a communication service corresponding to a type of an access network to which a terminal is connected (for example, non-3GPP access network, 3GPP access network) or the like is desired.

The present invention has been invented in consideration of the above issue and it is an object of the present invention to provide a system, a method, an apparatus, and a non-transitory computer readable medium storing a program, each making it possible to provide a communication service according to a network to which a terminal is connected.

According to one aspect of the present invention, there is provided a communication system comprising a data center connected to a core network connected with a base station and a wireless LAN, via a first wide area network (WAN 1), wherein the data center comprises:

a virtual core network that virtualizes at least a part of core network functions and is adapted to connect to the first wide area network; and a control unit configured to select connection to either the wireless LAN or the base station being selectable, and to variably control a service in the virtual core network according to a network to which a terminal connecting to the data center is connected between the network and the first wide area network.

According to another aspect of the present invention, there is provided a communication apparatus comprising:

an apparatus adapted to connect via a first wide area network to a core network connected with a base station and to a wireless LAN (Local Area Network);

a virtual core network that virtualizes at least a part of functions of the core network and is adapted to connect to the first wide area network; and a control apparatus that variably controls a service provided by the virtual core network to a terminal enabled to select connection to either the wireless LAN or the base station and connect to the data center, in accordance with a network connected between the terminal and the first wide area network.

According to another aspect of the present invention, there is provided a communication method by a data center that is adapted to connect to a core network connected with a base station and to a wireless LAN (Local Area Network) through a first wide area network (Wide Area Network), providing a virtual core network that virtualizes at least a part of functions of the core network and is adapted to connect to the first wide area network; and variably controlling a service provided by the virtual core network to a terminal enabled to select connection to either the wireless LAN or the base station, and that connects to the data center, in accordance with a network connected between the terminal and the first wide area network.

According to another aspect of the present invention, there is provided a terminal comprising:

means for communicating with a base station of a mobile network or a wireless LAN (Local Area Network); and means being able to select, at a setup, whether to make a call via the base station of the mobile network or to make a call via the wireless LAN.

According to another aspect of the present invention, there is provided a program causing a computer arranged in a data center adapted to connect via a first wide area network to a core network connected with a base station and to a wireless LAN (Local Area Network) to execute processing comprising;

operating a virtual core network that virtualizes at least a part of functions of the core network and is adapted to connect to the first wide area network; and variably controlling a service provided by the virtual core network to a terminal enabled to select connection to either the wireless LAN or the base station and connect to the data center, in accordance with a network connected between the terminal and the first wide area network.

According to yet another aspect of the present invention, there is provided a program causing a computer included in a terminal to execute processing comprising:

communicating with a base station of a mobile network or a wireless LAN (Local Area Network); and enabling to select whether to make a call via the base station of the mobile network or to make a call via the wireless LAN, when originating a call.

According to yet another aspect of the present intention, there is provided a program causing a computer included in a terminal to execute processing comprising:

communicating with a base station of a mobile network or a wireless LAN (Local Area Network); and enabling to select, at a setup, whether to make a call via the base station of the mobile network or to make a call via the wireless LAN.

According to the present invention, there is provided a computer readable recording medium (a storage such as a semiconductor memory, CD (Compact Disk)/DVD (Digital Versatile Disk) or the like) in which the program is recorded.

According to the present invention, it is possible to provide a communication service corresponding to a network to which terminal is connected.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 3A is a diagram illustrating an example embodiment of the present invention.

FIG. 3B is a diagram illustrating a VPN information storage unit of a gateway.

FIG. 3C is a diagram exemplifying a VPN information storage unit of a terminal.

DETAILED DESCRIPTION

The following describes example embodiments of the present invention. According to the example embodiment of the present invention, a data center, to which a terminal connects via a first wide area network via a base station and a core network or via a wireless LAN (Local Area Network), is adapted to variably control a communication service and the like, provided by a virtual network of the data center according to a network to which the terminal is connected between the first wide area network (Wide Area Network) and the terminal.

In the present embodiment, although not particularly limited, a virtualized EPC (vEPC) may be provided as a virtual network of the data center. The virtualized EPC (vEPC) may be configured by software based implementation of at least one or all of functions of nodes such as SGW, PGW, MME, HSS, PCRF and so forth by an application operating on a virtual machine. For example, as will be described later with reference to FIG. 12, the virtualized EPC (vEPC) may be implemented on a general-purpose server or the like arranged in the data center (DC) of a cloud operator that provides a cloud service (or data center service) to a client(s).

Figure 1:
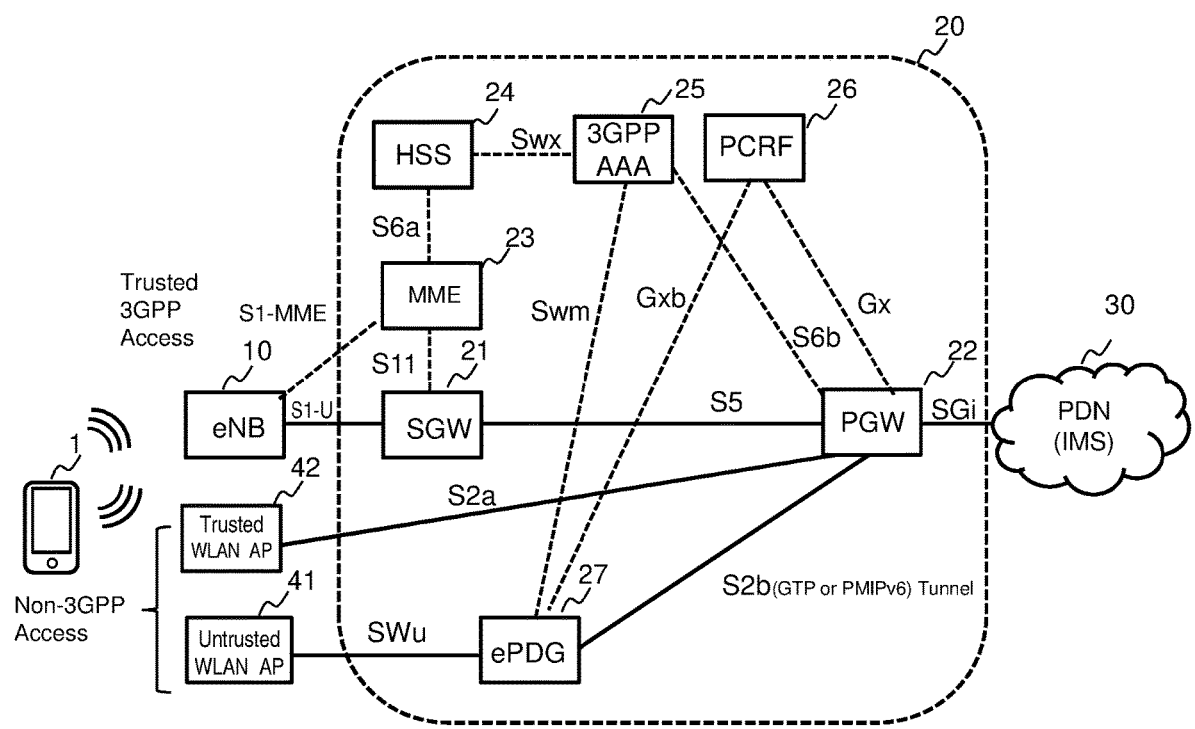
FIG. 1 is a diagram illustrating a related art.
Figure 2:
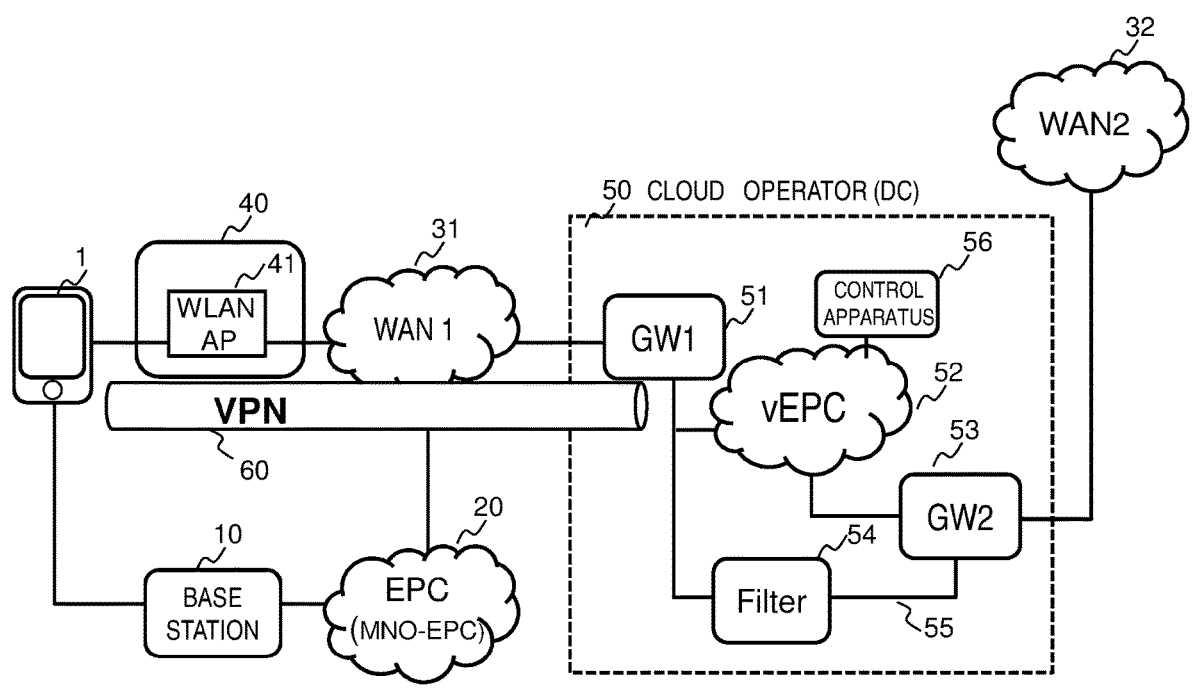
FIG. 2 illustrates an example embodiment of the present invention.

FIG. 2 is a diagram illustrating an example embodiment of the present invention. A virtualized EPC (vEPC) 52 in a data center 50 is a virtualized version of at least a part of the EPC 20 in FIG. 1. That is, the vEPC 52 may be a virtualized version of functions of some nodes of the EPC 20 such as ePDG 27, PGW 22, PCRF 26, etc. of the EPC 20 in FIG. 1.

A first gateway (GW 1) 51 (Ingress gateway) connects a wide area network (WAN) 1 (31) such as the Internet with the vEPC 52. A second gateway 53 (Egress gateway) connects a WAN 2 (32) such as the Internet, IMS, or the like to the vEPC 52.

In FIG. 2, a wireless LAN 40 may be a home wireless LAN or a public wireless LAN. The wireless LAN 40 includes a wireless LAN access point (WLAN AP), a wireless LAN router equipped with NAT (Network Address Transformation)/NAPT (Network Address Port Translation) and the like, and connects to the WAN 1 (31) via a modem or the like.

Further, the terminal 1 may access the data center 50 via the wireless LAN 40 such as Wi-Fi (registered trademark) by changing setup thereof. In this case, the terminal 1 connects to the WAN 2 (32) via the wireless LAN 40, and through the WAN 1 (31), the first gateway 51, the vEPC 52, and the second gateway 53 in the data center 50.

In FIG. 2, a part of the base station 10 and the EPC 20 to which the terminal 1 connects may be such ones that a cloud operator as a MVNO (Mobile Virtual Network Operator) carrier has borrowed from a communication carrier (MNO carrier). It is possible to provide various communication services to a client, as an MVNO carrier, via the virtualized EPC 52 in the data center 50.

There are provided a data center (DC) 50 of a cloud operator that can connect via the WAN 1 (31) to an EPC (MNO-EPC) 20 of an MNO carrier connected to the base station (eNB) 10 and the wireless LAN 40. The terminal 1 is enabled to select to connect to the wireless LAN 40 or connect to the base station 10. The first gateway 51 provided in the data center 50 includes a VPN apparatus which connects by a VPN between the terminal 1 and the first gateway 51 when the terminal 1 connects to the data center 50 via the wireless LAN 40. A virtualized EPC (vEPC) 52 provided in the data center 50 virtualizes at least a part of the function of the EPC. The VPN is terminated at the first gateway 51, which is connected to the WAN 2 via the virtualized EPC (vEPC) 52 and the second gateway 53. Furthermore, there is provided a filter 54 that performs filtering of a packet(s) supplied to the second gateway 53, at least from the WAN 2 (32) side. It is as a matter of course that the filter 54 may perform filtering of a packet(s) supplied the first gateway 51 from the WAN 1 (31) side as well as filtering of a packet(s) supplied to the second gateway (GW) 53.

Further, there is provided a control apparatus 56 that depending on what network via which the terminal 1 is connected to the WAN 1 (31), and depending on a type of the network (whether it is a wireless LAN, or a base station and an EPC), controls communication services of the vEPC 52 (for example, a charging method or a QoS policy) and controls to make a difference between networks to which the terminal 1 is connected. The control apparatus 56 is shown as a node connected to the vEPC 52 for the sake of explanation, but the control apparatus 56 may, as a matter of course, be provided in the vEPC 52, or the control apparatus 56 may be implemented in an appliance of the vEPC 52.

In LTE (Long Term Evolution), QoS control is performed both in a radio access network section between a terminal and a base station and in a core network (EPC). Here, the vEPC 52 may perform bandwidth guarantee of WAN 1 and/or WAN 2.

In the vEPC 52 of the data center 50, for example, when the terminal 1 accesses the vEPC 52 through the base station 10 and the EPC 20 (when the terminal connects to 3G/LTE) and via the WAN 1 (31), charging enforcement in the policy/charging enforcement function PCEF of the vEPC 52 is activated (that is, charging is carried out according to a charging policy from PCRF). On the other hand, when the terminal 1 accesses the terminal 1 accesses the vEPC 52 via the WAN 1 (31) through the wireless LAN access point 41 (for example, when the terminal 1 connects an untrusted non-3GPP access network), the PCEF in the vEPC 52 may be controlled such that the terminal 1 is not charged.

As an example case in which the terminal 1 is not charged by the vEPC 52, there is a wireless LAN IP phone VoWLAN (Voice over Wireless LAN) in which the terminal 1 connects to the data center 50 from the wireless LAN access point 41 via the WAN 1 (31) without going through the EPC 20. Further, when the terminal 1 performs Wi-Fi (registered trademark)-calling via the wireless LAN access point 41 and via the WAN 1 (31), connection from the ePDG of the MNO or MVNO to PGW of the EPC 20 or the vEPC 52 is performed. In this case, the terminal 1 may not be charged by the PCEF in the vEPC 52 (free).

In the example embodiment, allocation of an appliance(s) in the MNO-EPC 20 (see the EPC 20 in FIG. 1) and an appliance(s) in the vEPC 52 (for example, SGW is one in MNO-EPC 20, PGW is one in vEPC 52, etc.) is arbitrary.

However, as will be described later, ePDG, PGW, PCRF and the like are provided in the vEPC 52 of the data center 50, and a cloud company, as a communication carrier (MVNO), may provide the Wi-Fi (registered trademark)-calling service to the terminal 1 and may perform charging for the service and QoS control.

The EPS bearer in the data center 50 is different between the case where the terminal 1 is connected to the vEPC 52 of the data, center 50 via the wireless LAN, WAN 1 (31), by Wi-Fi (registered trademark)-calling, and the ePDG in the vEPC 52 is set as a security gateway; and the case where the terminal 1 is connected to the vEPC 52 of the data center 50 via the base station 10, the MNO-EPC 20, and the WAN 1 (31). Management and control such as instantiation (generation) and activation of an instance (virtual machine: VM) of a virtual network function (VNF) may be performed by a control apparatus (not shown) that manages and controls a virtual network function in the vEPC 52.

A VPN tunnel 60 is established between the first gateway 51 in the data center 50 and the terminal 1, where the WAN 1 (31) is provided between the data center 50 the wireless LAN access point 41 to which the terminal 1 connects.

A VPN apparatus (VPN router) is installed in the first gateway 51 and functions as a VPN gateway. The wireless LAN access point 41 is connected to the WAN 1 (31) via a wireless LAN router (not shown), a modem (not shown), and so forth. The terminal 1 is equipped with a VPN apparatus and functions as a VPN client. In the terminal 1, the VPN connection with the data center 50 is set via the wireless LAN. The VPN connection includes tunneling and encryption. When the WAN 1 (31) is the Internet, this VPN is a so-called Internet VPN.

According to the present embodiment, in the data center 50 of the cloud provider, it is possible to realize secure connection (voice call/SMS and data communication between the data center 50 and access via the wireless LAN 40 and the wide area network WAN1).

Further, on the network (virtual network) 55 between the first gateway 51 and the second gateway 53, a filter 54 to perform packet filtering is provided.

The filter 54 is configured to perform filtering control of a packet (downlink) input to the second gateway 53 from the WAN 2 (32) side. The filter 54 may is configured to perform filtering control of a packet (uplink) from the terminal 1 to the WAN 2 (32) side. The filter 54 is connected between the first gateway 51 and the second gateway 53. The filter 54 may be mounted on a server or the like managing the security policy. The filter 54 may be operated on a virtual machine on the server.

When the terminal 1 accesses the data center 50 via the wireless LAN 40 and the WAN 1 (31), control (packet filtering, or the like) provided by the core network (EPC) of the communication carrier is usually not performed, but according to the present embodiment, the filter 54 in the data center 50 provides a packet filtering function, or the like.

In FIG. 2, in the case of providing a service such as voice call, SMS, etc. to the terminal 1, in the data center 50, for example, via the first gateway 51, the vEPC 52, the second gateway 53, and via the WAN 2 (32), connection is made to a target terminal of voice communication or SMS message communication. On the other hand, a packet (traffic) for data communication between the terminal 1 and the WAN 2 (32) may be offloaded such that the packet does not pass through the vEPC 52, but is transmitted to the network (virtual network) 55 in the data center 50.

However, it goes without saying that in FIG. 2, a voice packet may be transferred to the network 55 between the first gateway 51 and the second gateway 53 of the data center 50. It is a matter of course that a data packet (data communication) between the terminal 1 and the WAN 2 (32) may be forwarded through the vEPC 52 in the data center 50.

It is noted that the filter 54 of the data center 50 may be configured as a packet filter type firewall that accepts/rejects a packet based on a packet header information (address, port number, protocol, etc.). However, the present invention is not limited to such a configuration, and may include a state-full inspection function (in which a connection is established between a proxy and a connection destination which is established by an application gateway (connection from the terminal is a proxy (firewall) that performs filtering at an application layer (seventh layer) such as HTTP (Hyper-text Transfer Protocol) or FTP (File Transfer Protocol)), a session table is created based on the packet header information (address, port number, protocol, etc.), and controls communication based on a direction and state of the communication. The application gateway type can restrict inappropriate browsing of Web sites, or the like.

Since the private IP address is assigned to the terminal 1 connected to the wireless LAN/3GPP access network and the address/port number is converted by NAT/NAPT, a packet having the private IP address set as a destination or a source in a header of the packet does not flow. In order to block IP address spoofing, the filter 54 may be configured to reject packets from the WAN 2 (32) destined for the private IP address.

In the case where the WAN 2 (32) is an IMS (IP Multimedia Subsystem), for example, a SIP (Session Initiation Protocol) message transmitted from the terminal 1 is sent from a proxy session control function P-CSCF (Proxy Call Session Control Function) to a serving session control function S-CSCF (Serving Call Session Control Function) on a home network side of the IMS and analyzed, and then a SIP message is sent to a S-CSCF on a called side or media gateway control function MGCF. From the S-CSCF on the called side, the Internet, another IMS, or a MGW (Media Gateway) between an IP network and an existing telephone network, or from a SGW (Signaling Gateway) that is provided between a Circuit Switched (CS) network and the IP network and terminates a call control signal from an SS7 common line signaling network and converts the call control signal to a call control signal on the IP network, a communication service is provided to a line switching domain or the like.

Alternatively, in the data center 50, at least a part of the IMS function may be implemented on the virtual network 55. For example, a function of a SIP server (for example, P-CSCF) or the like may be implemented on the virtual network 55. The filter 54 may be operated on a virtual machine, wherein content filtering for analyzing and blocking contents of a speech and a call rejection list for prohibiting an incoming call from an inappropriate number may be provided. It is noted that a configuration in which a control apparatus including content filtering and a call rejection list prohibiting incoming from an inappropriate number is not implemented on a virtual machine but implemented as a real apparatus connected between the first and second gateways 51 and 53.

Although not particularly limited thereto, the first gateway 51 as a VPN gateway, performs such processing as follows:
Establishment of a VPN tunnel between first gateway 51 and the terminal 1 via a wireless LAN, and WAN 1;
Negotiation of security parameters;
User authentication;
Assigning private IP addresses;
Data encryption and decryption;
Management of security keys;
Management of data transfer via a VPN tunnel;
Management of transmission and reception data transmission as an endpoint of a VPN tunnel or a router, and so forth.

It is noted that assignment of private IP addresses may be performed not by the gateway 51 but by PGW or the like in the vEPC 52.

As a VPN tunneling protocol, PPTP (Point-to-Point Tunneling Protocol), L2TP (Layer 2 Tunneling Protocol), IPsec, GRE (Generic Route Encapsulation) and the like may be used, for example. The protocol that performs encryption is IPsec. When IPsec is used as the VPN tunneling protocol, as described above, it is encapsulated by the ESP protocol. For IPSec-SA setting, key exchange is performed by IKE protocol (in IKE, port 500 of UDP (User Datagram Protocol) is used).

For example, since a router or the like installed in a wireless LAN connects to a plurality of terminals (VPN clients), it has a NAPT function that converts a private IP address and a global IP address of a terminal, and a port number in a Transmission Control Protocol (TCP)/User Datagram Protocol (UDP) header.

Figure 13A:
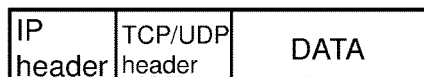
FIG. 13A illustrates an IP packet.
Figure 13B:
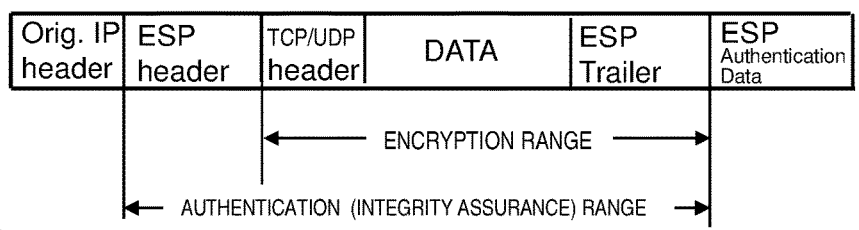
FIG. 13B illustrates an ESP packet in a trans-mode.
Figure 13C:
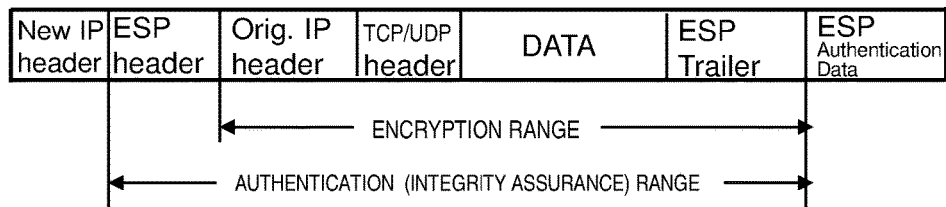
FIG. 13C illustrates an ESP packet in a tunnel mode.

In a tunneling mode of IPSec, an IP header and a data portion (FIG. 13A) are collectively encrypted, and a new IP header (New IP Header in FIG. 13C) is added and transmitted (IETF RFC 4303). In NAPT, an IP address field of an IP header and a port number of a TCP/UDP header are changed. In an ESP protocol, as shown in FIG. 13C, an ESP header (SPI, Serial Number) is placed next to the IP header, and there is no port number field in the ESP header. Therefore, NAPT for address translation does not work. That is, if a NAPT exists between the terminal 1 and the first gateway 51 in FIG. 3, the VPN using IPsec will not be established by the NAPT.

Figure 13D:
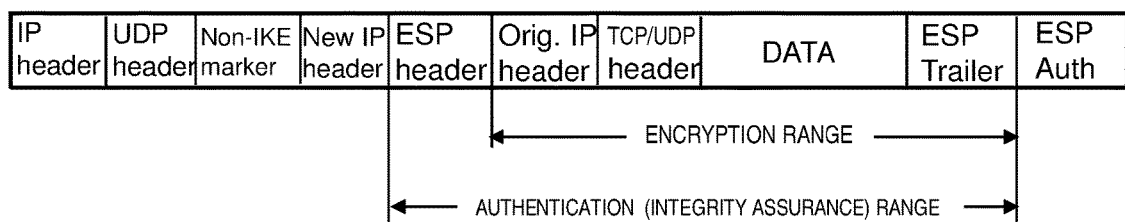
FIG. 13D illustrates a UDP encapsulation.

In this case, in order to make IPsec VPN correspond to NAPT, as shown in FIG. 13D, UDP encapsulation (UDP Encapsulation of IPsec Packets) method in which a UDP header is added to the ESP packet, may be used. In the case of a UDP capsulation, in FIG. 13D, the first IP header is an IP header used for forwarding, and source and destination port numbers of the added UDP header are 500 which is the same port number used in IKE. When the port number is changed by NAT/NAPT, the changed number is used as it is. A checksum field (checksum) of the added UDP header is set to 0. A non-IKE marker following the UDP header is setting information for distinguishing it from the IKE packet (in which 0 is entered). This is to indicate that the packet is not an IKE packet, because the port number of the added UDP header uses the same port number as the port number of the IKE packet. In this portion of the IKE packet, a cookie (cookie) value, for example, a cookie value generated by an initiator of the negotiation of ISAKMP_SA and a cookie value generated by a response side of the negotiation of ISAKMP_SA are included.

Figure 13E:
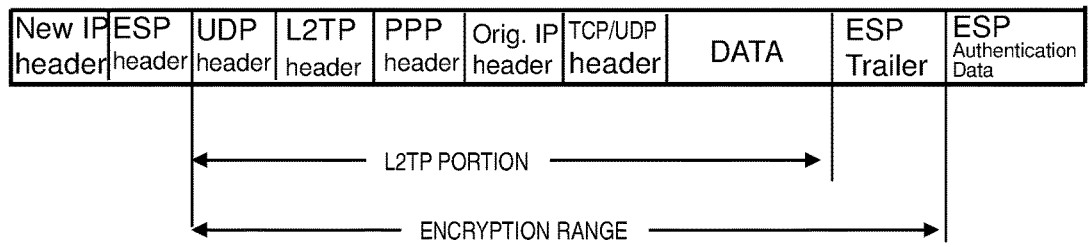
FIG. 13E illustrates an L2TP/IPsec packet.

L2TP, by encapsulating a Point-to-Point Protocol (PPP) frame with UDP, enables exchange the encapsulated frame over the IP network and realizes VPN between two sites, LAC (L2TP Access Concentrator) and LNS (L2TP Network Server). L2TP/IPsec is a protocol that performs encryption by IPsec in L2TP which does not have a mechanism of encryption. In L2TP/IPsec, a connection (SA) by IPSec is first established. FIG. 13E is a diagram illustrating a packet format of L2TP/IPsec.

In order to make a VPN tunnel correspond to NAT/NAPT, in addition to UDP encapsulation, a NAT traversal method that automatically detects NAT by detecting a change in an IP address or a port number may be used.

Next, a procedure of setting up a VPN tunnel using IPsec between the VPN client (terminal 1) and the VPN gateway (GW 51) will be described.

(1) Key generation information is generated and exchanged from a pre-shared key set with a communication partner by IPsec communication, an IKE SA (ISAKMP SA) is established, and the key is created from the key creation information (IKE Phase 1). Note that the authentication algorithm, the encryption algorithm, and the pre-shared key are the same between the VPN client (terminal 1) and the VPN gateway (GW 51).

(2) Next, an IPsec tunnel for data communication is set up. Communication on IKE SA is performed and SA for data communication is established. If the authentication algorithm and key are the same as those of the connection destination, IPsec SA is established. A key for communication with IPsec SA (IKE Phase 2) is created. IPsec disappears within a certain time. IKE SA is kept for a long time as compared with IPsec SA.

(3) Next, encryption and decryption are performed on data to be encrypted using the encryption algorithm and a key created by IPsec SA. The encrypted data is transferred over IPsec SA. As the encryption algorithm, DES (Data Encryption Standard), 3DES (Triple Data Encryption Standard), or the like may be used, and MD5 (Message Digest Five), SHA-1 (Secure Hash Algorithm) or the like is used as the authentication algorithm.

FIG. 3A is a diagram illustrating a configuration of the terminal 1 and the VPN apparatus of the first gateway 51 in the data center 50. A VPN setting unit 512 of the VPN apparatus 511 of the first gateway 51 controls VPN setting and stores setting information in the VPN information storage unit 513. A VPN communication control unit 514 controls the connection of the VPN tunnel (IKE phases 1 and 2), and controls communication of data communication via the VPN tunnel by encryption and decryption. The terminal 1 has the same configuration.

In the case of IPsec VPN, when setting the VPN tunnel in the first gateway 51, the VPN setting unit 512 sets a VPN identifier (VPN tunnel identifier) for identifying the VPN, a pre-shared key, a communication target (name, etc.), an authentication algorithm, an encryption algorithm, presense or absense of IKE keep-alive (when disconnecting VPN, reconnecting). Furthermore, a network address (IP address+ netmask) of a route is set as routing information. Furthermore, the presence/absence of user authentication by XAUTH (eXtended AUTHENTICATION) and presence/absence of NAT traversal are set. XAUTH encrypts and exchanges a user name and a password between a VPN remote client and a server after IKE phase 1 (apparatus authentication), and performs user authentication.

Also in the VPN setting unit 102 of the VPN apparatus 101 of the terminal 1, a setting name, a pre-shared key, a client name, a connection destination gateway (IP address or name), an authentication algorithm, an encryption algorithm, a connection destination network, presence/absence of NAT traversal, etc. are set.

In the VPN information storage unit 513, for example, IKE cryptographic algorithms (3DES-CBC (Cipher Block Chaining Mode), DES-CBC, AES (Advanced Encryption Standard)-CBC);
IKE hash algorithm (MD5, SHA-1);
Encapsulation of ESP (Encapsulated by UDP and transmitted/received so as to enable IPsec communication in an environment not able to pass ESP by NAT);
Pre-shared key (pre-shared-key);
The policy of SA (for example, policy identifier (Policy_ID), VPN gateway identifier (gateway), authentication header (AH), authentication algorithm, a network identifier of an own apparatus's side and a network identifier of a target side);
Transport mode definition (source port list, destination port list), and
Presence or absence of NAT traversal, and so forth, may be included. These items of information may be set by the command input by the VPN setting section.

FIG. 3B is a diagram illustrating one example of the VPN management information set by the VPN setting unit 512 and stored in the VPN information storage unit 513. The VPN is given a VPN identifier and managed for each terminal (user). In FIG. 3B, a connection partner IP address is a private IP address (local IP address) of the VPN client (terminal 1) allocated by the first gateway 51 or the like (DHCP server). The terminal ID/name of the connection destination may be an ID of the terminal 1 (for example, IMSI (International Mobile Subscriber Identity)) or the user ID. The apparatus address is an IP address of the VPN tunnel side of the first gateway 51 (router). A connection network is a network to which the VPN communication is transmitted, and is a network address of the VPN tunnel side.

In the example of FIG. 3B, an IP address assigned to the terminal 1 in FIG. 3A is set to 100.1.100.1 and an IP address assigned to a connection network is set to 100.1.100.1 (net mask: 32) which is an IP address assigned to the terminal 1. A packet addressed to the terminal 1 from the data center 50 is searched by a wireless LAN router connected to the WAN 1 (31) and transmitted via the wireless LAN access point connected to the corresponding port to the terminal 1 by VPN. In a case where a plurality of wireless LAN access points are included in one WLAN, in addition to the IP address of the terminal 1, the terminal ID, or the like, as VPN management information, for example, there may be provided a name of a wireless LAN access point name (APN) of the connection destination of the terminal 1, or port information of a wireless LAN router to which the wireless LAN access point connects, or the like. It is noted that the VPN information shown in FIG. 3B is an example, and it is as a matter of course that the present invention is not limited to such a configuration.

FIG. 3C is a diagram illustrating an example of VPN management information set by the VPN setting unit 102 of the VPN client terminal 1 and stored in the VPN information storage unit 103. A connection destination may be designated by a host name of the site (for example, Fully Qualified Domain Name (FQDN) of the data center 50). The connection network is a network to which a VPN communication from the VPN client (terminal 1) is transmitted and is a network address of a VPN tunnel side of the first gateway 51. A connection network is set to a VPN side address of the first gateway 51: 100.1.1.0/24 (netmask: 24).

The VPN communication control units 514 and 104 terminate the VPN tunnel, manage the security key, manage the data transfer via the VPN tunnel, control transmission of the transmission/reception data as the VPN tunnel end point or the router, encrypt the data and packet transfer by encapsulation, decapsulation and decryption of a packet.

In FIGS. 3B and 3C, an example of IPv4 (Internet Protocol Version 4) is illustrated, but it is a matter of course that it is not limited to IPv4. Also, IP addresses in FIGS. 3B and 3C are imaginary addresses.

In FIGS. 3B and 3C, an example in which an IPsec tunnel is used as the VPN tunnel has been described, but when L2TP/IPsec is used, an L2TP tunnel is arranged in the IPsec tunnel. A connection control message and a session control message are used for establishing the L2TP tunnel. When constructing a VPN with L2TP/IPsec, a session is established by a session control message after creating a tunnel with a connection control message.

As described above, the VPN is allocated in units of terminals (terminal ID, common account). In FIG. 3B, in addition to a user ID, a field of the terminal ID/name may be a user account (for example: "aaa@example.com") provided to the user by a cloud company of the data center 50. That is, in the first gateway 51, in addition to an IP address of the terminal 1 (VPN client), information specific to a user (a user account or a Web mail address, etc.) may be used for management of the VPN.

When the terminal 1 first accesses the wireless LAN access point 41, the wireless LAN access point 41 forwards an access request packet from the terminal 1 to the main data center 50 via the WAN 1 (31). The first gateway 51 of the data center 50 assigns an IP address (private IP address) to the terminal 1 and puts up a VPN tunnel 60. When the VPN tunnel 60 is an IPsec tunnel, the establishment of IKE SA (IKE phase) 1, and the establishment of IPsec SA (IKE phase 2) are performed as described above, and encrypted communication is performed on the IPsec SA.

Figure 4:
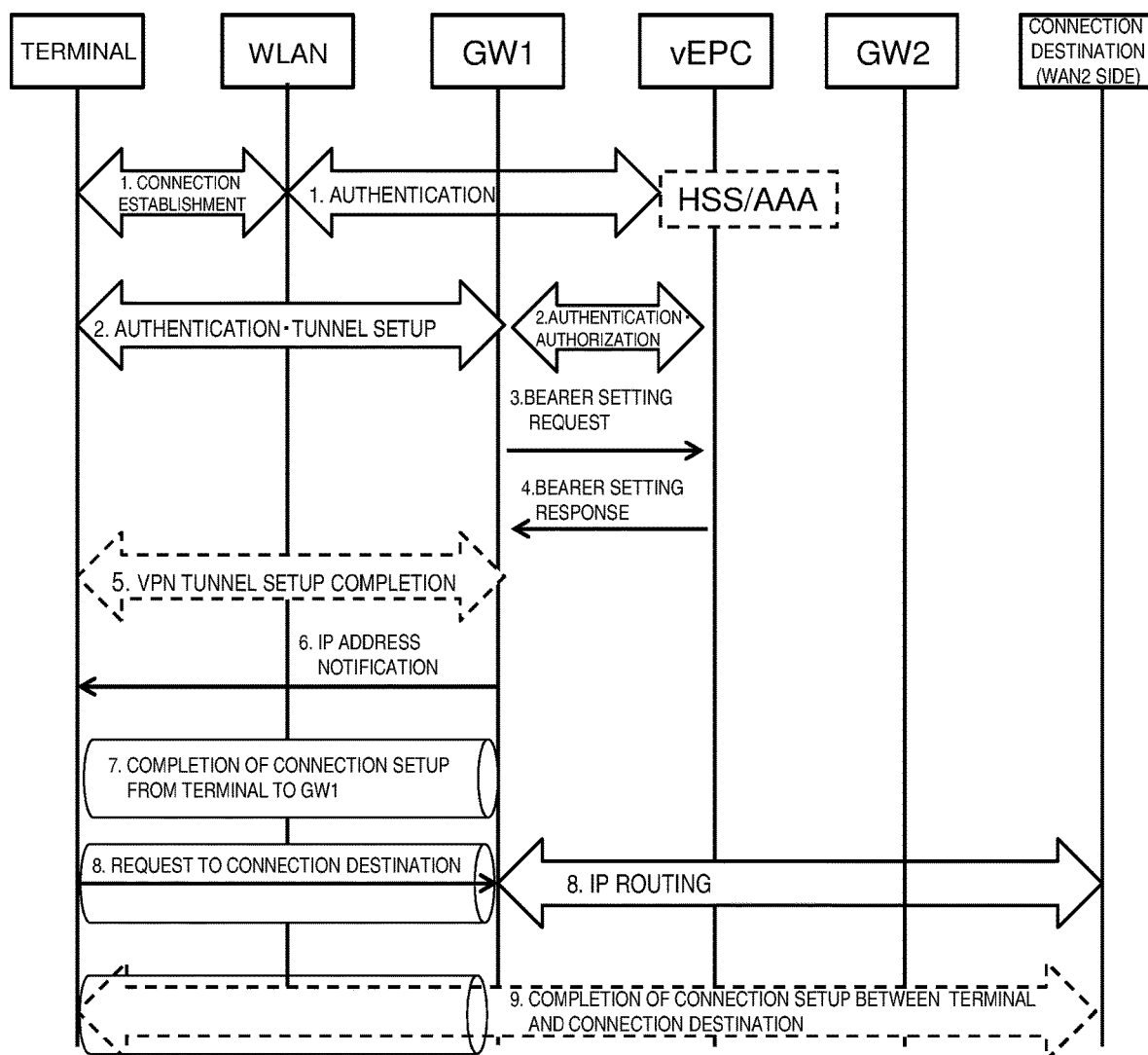
FIG. 4 is a diagram illustrating an operation sequence of an example embodiment of the present invention.

FIG. 4 is a diagram for explaining an example of an attach process of the terminal 1 and a sequence to be connected to a connection destination that is connected to the WAN 2 (32) in the system of the embodiment of FIG. 2.

In FIG. 4, there is schematically shown an example of an operation sequence of the terminal 1, the WLAN 40 (WLAN AP), the first gateway 51, the vEPC 52, the second gateway 53 (GW 2), and the connection destination on the side of the WAN 2 (32) in FIG. 2. The numbers assigned to each sequence operation are sequence numbers for explanation.
1. The terminal 1 establishes a connection with the wireless LAN (WLAN) 40, and authentication and authorization (authentication & authorization) is performed by, for example, HSS/AAA (not shown) in the vEPC 52. In the example of FIG. 4, it is assumed that the first gateway 51 is set as a gateway to which the terminal 1 is connected, when accommodating the wireless LAN 40 which is non-3GPP wireless access (Untrusted Non-3 GPP IP Access) which is not reliable for security.
2. From the terminal 1 side, the IKE authentication/tunnel setup procedure with the first gateway (GW 1) 51 is executed. This corresponds to the IKE phases 1 and 2 described above. It may be an IKEv2 authentication tunnel setup.
3. The vEPC 52 includes an SGW and a PGW. When the setting of the bearer is required, the first gateway (GW 1) 51 may function as an MME and transmit a bearer setting request (Create Session Request) to the SGW. In this case, a PGW connected to the packet data network of the connection destination is selected, and a GTP (GPRS (General Packet Radio System) Tunneling Protocol) tunnel is established in the S8 interface between the SGW and the PGW.

4. A bearer setting response (Create Session Response) is transmitted from the SGW of the vEPC 52 to the first gateway (GW 1) 51 functioning as the MME.

5. This completes the setup of the IPsec VPN tunnel.

6. The IP address assigned to the terminal 1 is notified to the terminal 1 from the first gateway (GW 1), using the IKEv 2 message.

7. The IP connection from the terminal 1 to the first gateway (GW 1) is set at this point. The above corresponds to the sequence of the attach process.

8. Upon reception of a connection request to the connection destination on the WAN 2 (32) side from the terminal 1 side, IP routing from the first gateway (GW 1) 51 to the connection destination (WAN 2 side) is performed.

9. This completes the setting of connection, from the terminal 1 via the VPN and the vEPC 52 of the data center 50, with the connection destination on the WAN 2 side. A packet in a downlink direction from the WAN 2 (32) side to the terminal 1 is forwarded by the PGW in the vEPC 52 to the first gateway 51 according to a policy such as PCRF, and then forwarded from the first gateway 51 via the VPN tunnel 60 to the terminal 1.

Figures 5A, 5B:
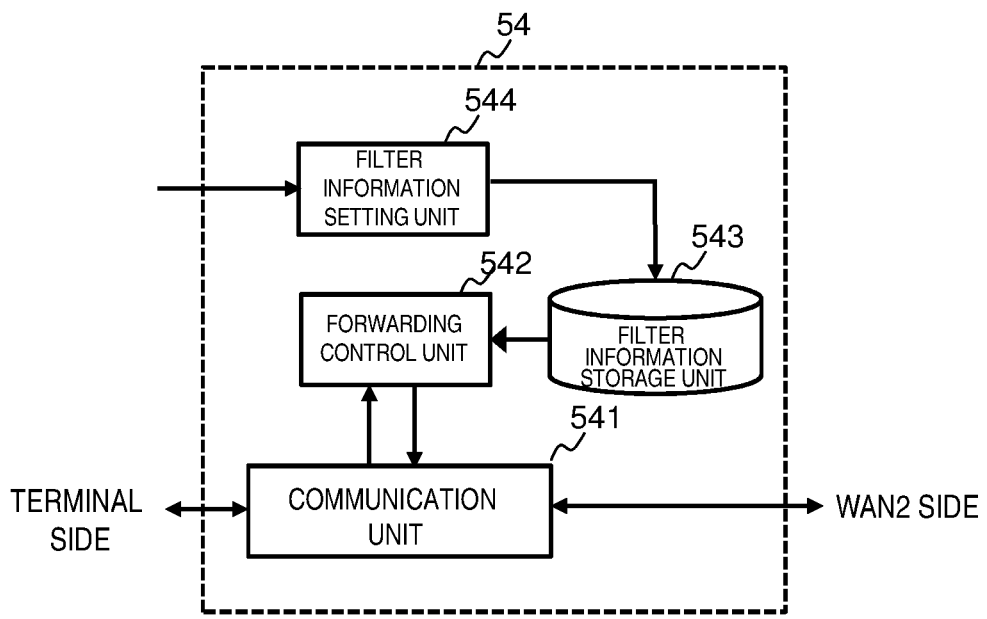
FIG. 5A and FIG. 5B are diagrams illustrating a filter according to an example embodiment of the present invention.

FIG. 5A is a diagram showing an example of a configuration of the filter 54 in FIG. 2. Referring to FIG. 5A, the filter 54 includes a communication unit 541, a filter information storage unit 543, a transfer control unit 542, and a filter information setting unit 544. The communication unit 541 receives a packet and causes a permitted packet to perform voice communication under control of the transfer control unit 542.

The filter information storage unit 543 stores filter information for controlling discarding and passing of a packet.

The communication unit 541 extracts an address, a port, and a protocol from a header of a packet received, compares the extracted information with a condition in the filter information storage unit 543, determines rejection and permission of the packet, and notifies the communication unit 541 of the determination result.

The filter information setting unit 544 sets filter information in the filter information storage section 543. The filter information setting unit 544 may set the filter information in the filter information storage unit 543 from a management terminal (not shown) in the data center 50 of FIG. 2 or from a bearer resource correction request from the terminal 1 or the like.

FIG. 5B shows an example of packet filter information as the configuration of the filter information storage unit 543 of FIG. 5A. Referring to FIG. 5B, a type (handling of packet conforming to filter condition: passing or discarding), direction (direction of filter evaluation: a direction from a wireless LAN to WAN 2 to WAN 2 is set to UP, from WAN 2 to a wires LAN is set DOWN). A protocol (IP protocol of a packet to be filtered), a source address (source IP protocol of a packet to be filtered), a transmission port (a source port of a packet to be filtered), a destination address Destination IP protocol of a packet to be subjected to packet), a destination port (destination port of a packet to be filtered), and the like.

For the filter ID=1, a packet from a port 23 (telnet) to the first gateway (GW 1) 51 may be discarded (blocking the telnet port (23)). For filter ID=2, a packet destined for a private IP address of terminal 1 may be discarded. For filter ID=3, a packet destined to a specific destination address from the terminal 1 is discarded. Note that the symbol "*" in FIG. 5B represents arbitrary (any).

In FIG. 5B, the filter information of filter ID=2, 3, etc. is information unique to terminal 1 (subscriber). It is a matter of course that the filter information of filter ID=1 (a packet with destination GW 1, transmission port=23) in FIG. 5B may be included in the filter information corresponding to terminal 1 (subscriber).

When allocating the function block 54 for each terminal (subscriber) in the function block 54 of FIG. 5B, the filter information of FIG. 5B may be set for each terminal (subscriber) by the filter information setting unit 544. The filter information may be managed in association with the terminal, and other units such as the transfer control unit 542, the communication unit 541, and the filter information setting unit 544 may be realized by using common codes for a plurality of terminals. In the data center 50, regarding the management of the terminal 1 (subscriber), a user account assigned to a user by the data center 50 may be used for a user of the terminal 1.

Figure 6:
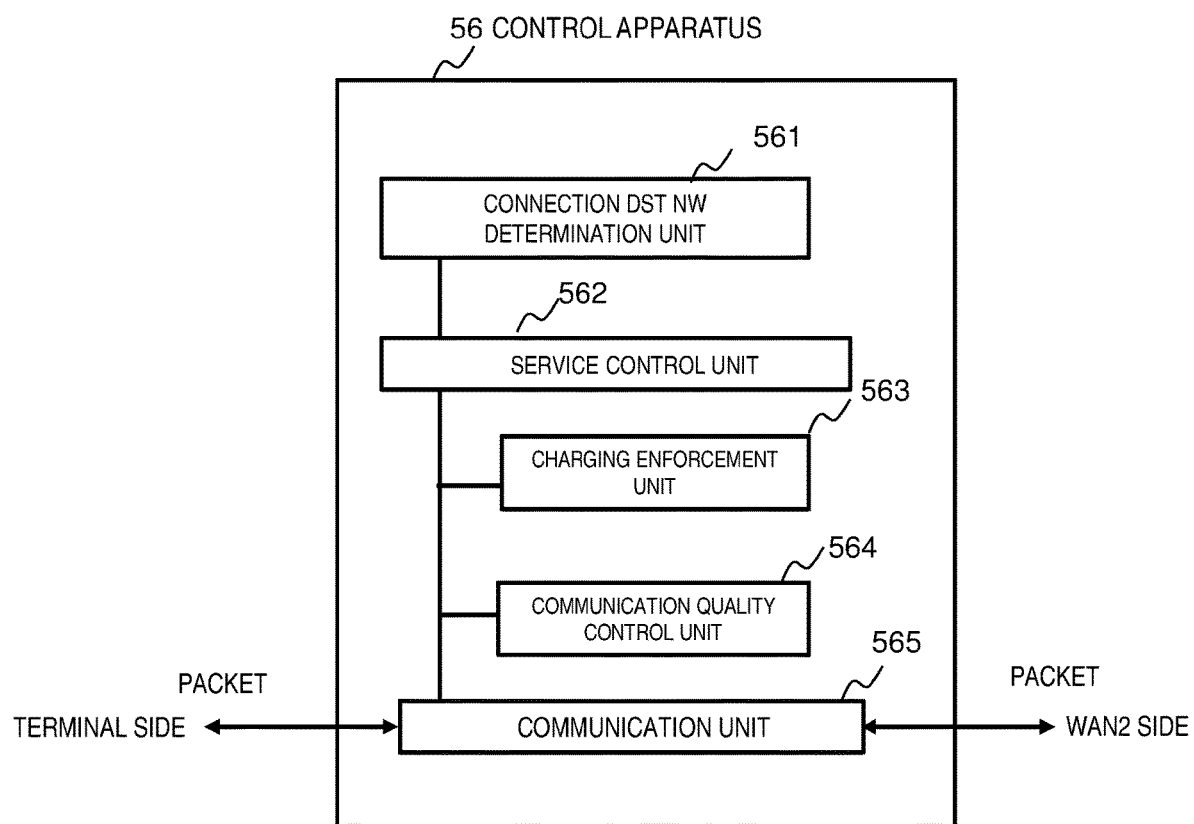
FIG. 6 is a diagram illustrating a control apparatus according to an example embodiment of the present invention.

FIG. 6 Illustrates the controller 56 that controls a charging method, a communication quality (QoS), and the like performed in the vECP 52 of the data center 50 according to whether a network to which the terminal 1 is connected is a wireless LAN, or the base station 10 and the EPC 20 in FIG. 2.

Referring to FIG. 6, the control unit 56 includes a connection destination network determination unit 561 that determines a network to which the terminal is connected, a service control unit 562 that performs setting and control of necessary services according to a network type (wireless LAN, 3G/LTE, etc.) determined by the connection destination network determination unit 561, a charge execution unit 563 that performs charging on a packet basis based on setting information (charge policy) from the service control unit 562, a communication quality control unit 564 that controls communication quality on a packet basis on the basis of setting information (QoS policy) set by the service control unit 562, and a communication unit 565 that exchanges a captured packet with the charging execution unit 563 and is controlled by the communication quality control unit 564.

The connection destination network determination unit 561 may be configured to obtain from the terminal, information as to whether the connection destination of the terminal is a non-3GPP access network (wireless LAN access point) or a 3 GPP access network (base station) when the terminal establishes a connection, for example. Alternatively, the connection destination network determination unit 561 may obtain connection destination network information of the terminal from radio bearer information managed by MME, or authentication result information at the HSS, 3 GPP AAA server, or the like, when the terminal establishes connection. The communication unit 565 stores the received packet in a reception buffer (not shown), and under the control of the communication quality control unit 564, performs priority control such as taking out packets in descending order of priority to send the packets, and performs bandwidth control necessary for bandwidth guarantee or the like of WAN1 and/or WAN 2.

Figure 7:
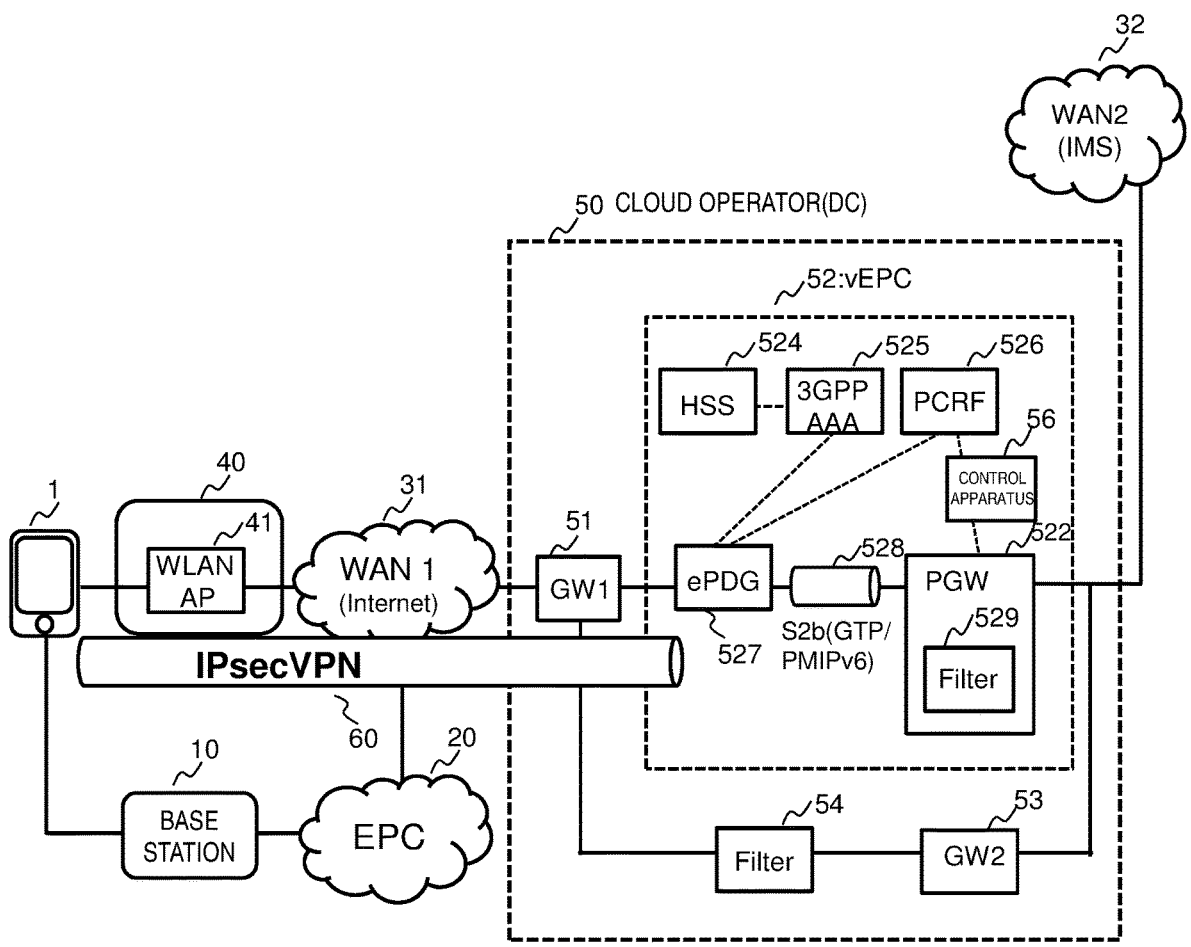
FIG. 7 illustrates another example embodiment of the present invention.

FIG. 7 is a diagram illustrating an example of the above-described embodiment. Referring to FIG. 7, an IPsec tunnel is established between the ePDG 527 of the vEPC 52 in the data center 50 and the terminal 1. The ePDG 527 functions as a VPN gateway and terminates the VPN tunnel.

The ePDG 527 functions as a VPN gateway to perform the followings:
Establishment of a VPN (IPsec) tunnel with the terminal 1 via the wireless LAN 40, and WAN 1 (31);
Negotiation of security parameters;
User authentication;
Assigning a private IP address to terminal 1;
Data encryption and decryption;
Management of security keys;
Management of data forwarding via VPN tunnel; and
Management of transmission and reception of data as an endpoint of VPN tunnel.
It is noted that the assignment of the private IP address to the terminal 1 may be performed by the PGW 522 of the vEPC 52.

The EAP message is transmitted to the ePDG 527 from the terminal 1 using IKEV 2, and relayed to the 3 GPP AAA server 525 of the vEPC 52, where the EAP-SIM/EAP-AKA authentication is performed. The ePDG 527 of the vEPC 52 and the PGW 522 are connected via GTP or PMIPv6 tunnel.

In the case where a proxy mobile IP (PMIPv6 tunnel) is used between the PGW 522 and the ePDG 527 in the vEPC 5, when an IPsec tunnel is established between the terminal 1 and the ePDG 527 of the vEPC 52, the ePDG 527 transmits a proxy binding update (Proxy Binding Update) to the PGW 522. As a result, in the PGW 522 of the vEPC 52, the destination of an incoming call to the terminal 1 is switched to the ePDG 527 of the vEPC 52, and the incoming call is notified to the terminal 1 via the VPN tunnel 60 and via the wireless LAN 40.

The PGW 522 includes, for example, a filter 529 having a TFT (Traffic Flow Template) related to an EPS bearer. As described above, setting (addition, modification, deletion, etc.) of a packet filter in a downstream direction from the WAN 2 to the terminal 1 side in the filter 529 may be performed with a Request Bearer Resource Modification message of the bearer resource correction procedure from the terminal 1. Alternatively, setting may be performed in connection processing such as an Attach Request message or the like from the terminal 1, or at an occurrence of a predetermined event, or the like. It is a matter of course that the filter 529 may be configured to have a function of performing filtering in an application layer or to have stateful inspection function. Alternatively, the filter 529 may be provided with a call rejection list for rejecting incoming calls from the WAN (32).

When the WAN 2 (32) is configured by IMS, P-CSCF (Proxy-Call Session Control Function) and Serving-CSCF connected to vEPC 52 may be configured to have content filtering that analyzes contents of voice for blocking and a call rejection list for prohibiting incoming calls from inappropriate numbers.

The control apparatus 56 is composed of the control apparatus 56 described with reference to FIG. 6. In this embodiment, the control apparatus 56 is connected to the PCRF 526, and based on accounting information and QoS policy information notified from the PCRF 526, the control apparatus 56 carries out a control to make a difference in charging control and QoS policy according to a network to which the terminal 1 is connected. The control apparatus 56 may be implemented as a PCEF node. Alternatively, the control apparatus 56 may be mounted in the PGW 522.

The service control unit 562 (FIG. 6) of the control apparatus 56 sets charging and QoS policies according to a network type to which the terminal 1 is connected, based on charging information and QoS policy information notified from the PCRF 526 via a Gx interface, for example. The connection destination network determination unit 561 of FIG. 6 may determine, from a result of SIM authentication in the ePDG 527, HSS 524 and 3 GPP AAA 525, that a path from the terminal 1 includes the wireless LAN 40. It is noted that the first and second gateways 51 and 53 may be constituted by routers (edge routers).

In FIG. 7, the ePDG 527 and the PGW 522 are implemented as the vEPC 52. However, the ePDG 527 and the PGW 522 may be ePDG 27 and PGW 22 (FIG. 1) of MNO (Mobile Network Operator) that a cloud operator as MVNO (Mobile Virtual Network Operator) has borrowed from the MNO.

For example, regarding Wi-Fi (Registered Trademark)-Calling from the terminal 1, a VPN 60 (IPsec tunnel) via the wireless LAN 40 and WAN 1 (31) is established between the terminal 1 and the ePDG 527 and a tunnel of GTP/PMIPv 6 is established between the ePDG 527 and the PGW 522, and connection is made from the PGW 522 to a connection destination via the WAN 2 (32) composed of IMS, for example. That is, Wi-Fi (registered trademark)-Calling is controlled as a communication service by a cloud operator (MVNO) to provide a secure connection and through the filter 529 provide protection from unauthorized incoming calls and harmful sites etc. Note that the PGW 522 has a function of the second gateway 53 in FIG. 3.

The filter 54 in FIG. 7 is the same as the filter 54 described with reference to FIG. 2 and the explanation is omitted.

In FIG. 7, it is as a matter of course that in addition to the nodes (virtual machines) and the control apparatus 56 which virtualize network functions of the vEPC 52, the filters 54, or the like may be also realized by programs executed on a computer such as a server to realize functions and processing thereof, Of course it is also possible to do so.

Figure 8:
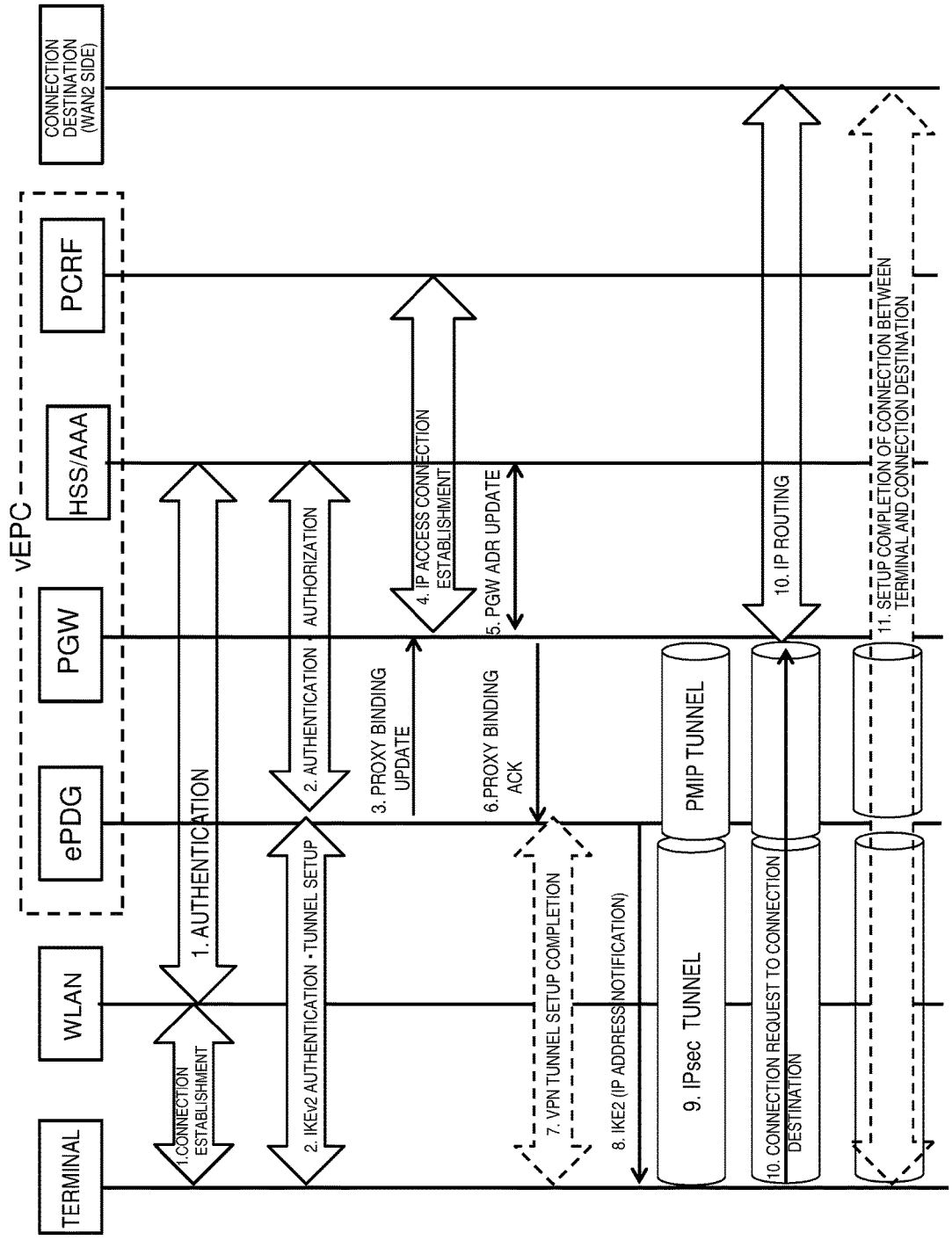
FIG. 8 is a diagram illustrating an operation sequence of another example embodiment of the present invention.

FIG. 8 is a diagram for explaining an attach processing of the terminal 1 and a sequence for communication connection to a connection destination that connects to the WAN 2 (32) in the system of FIG. 7. FIG. 7 illustrates an example of an operation sequence in the terminal 1, WLAN 40 (WLAN AP), ePDG 527, PGW 522, HSS 524/AAA server 525, PCRF 526, and a connection destination on side of WAN 2 (32) in FIG. 6. The numbers assigned to each sequence operation are sequence numbers for explanation. In FIG. 8, for example, when replacing the ePDG 527 with the first gateway (GW1) and replacing the PGW 522 with the second gateway (GW2), the operation can partially correspond to the operation described with reference to FIG. 4.

1. The terminal 1 establishes a connection with the wireless LAN (WLAN) 40, and performs authentication/authorization (Authentication & Authorization), for example, by the HSS 524/AAA 525 in the vEPC 52.

2. From the terminal 1 side, the IKEv2 authentication/tunnel setup procedure between the ePDG 527 and the terminal 1 (IKEv 2 phases 1 and 2, etc.) is executed.

3. The ePDG 527 transmits to the PGW 522 a Proxy Binding Update (request message transmitted by MAG (Mobile Access Gateway) to LMA (Local Mobility Anchor), in order to establish a binding between a mobile node's home network prefix and the MAG to which the mobile node is connected).

4. The PGW 522 cooperates with the PCRF 526 to establish an IP connection access network (IP-CAN (Connection Access Network)) session.

5. The PGW 522 notifies the AAA server 525 of identification information (PGW ID) of the PGW, and the AAA server 525 notifies the HSS 524 of an ID of the PGW 522 and an APN (Access Point Name) corresponding to the terminal 1 for registration.

6. The PGW 522 performs a proxy binding update processing and creates a binding cache entry corresponding to the terminal 1. As a result, the PGW 522 transmits a packet addressed to the terminal 1 to the ePDG 527 in accordance with contents held in the binding cache entry. The PGW 522 transmits a Proxy Binding Ack to the ePDG 527.

7. The above completes the setup of the IPsec VPN tunnel.

8. An IP address is notified from the ePDG 527 to the terminal 1 by an IKEv2 message.

9. Setup of IP connection from the terminal 1 is completed. An Psec tunnel between the terminal 1 and the ePDG 527 and a tunnel such as PMIP (Proxy Mobile Internet Protocol) between the ePDG 527 and the PGW 522 are established. The above corresponds to the sequence of the attach process.

10. When a connection request from the terminal 1 side to a connection destination of the WAN 2 (32) side is received from the ePDG 527 via the PMIP tunnel, IP routing from the PGW 522 to the connection destination (WAN 2 side) is performed. In this case, a SIP message from the terminal 1 is transmitted to the P-CSCF of the IMS via the second gateway 53 and is connected via S-CSCF, MGCF, and MGW to the connection destination of PSTN (Public Switched Telephone Networks), for example. Alternatively, it may be connected from the S-CSCF to the Internet or a connection destination connected to the other IMS. In FIG. 8, it is assumed that the terminal 1 has already been registered in the IMS. The P-CSCF of IMS and the PGW 522 (SGi interface) communicate with IPsec (VPN).

11. This completes the setting of the connection with the connection destination on the WAN 2 side via the VPN from the terminal 1 and the vEPC 52 of the data center 50. A packet in a downlink direction from the WAN 2 (32) side to the terminal 1 is forwarded to the ePDG 527 via the PIMP tunnel to the ePDG 527 by the PGW 522 in the vEPC 52 based on a binding cashe entry, and forwarded from the ePDG 527 to the terminal 1 via the VPN tunnel 60.

Figure 12:
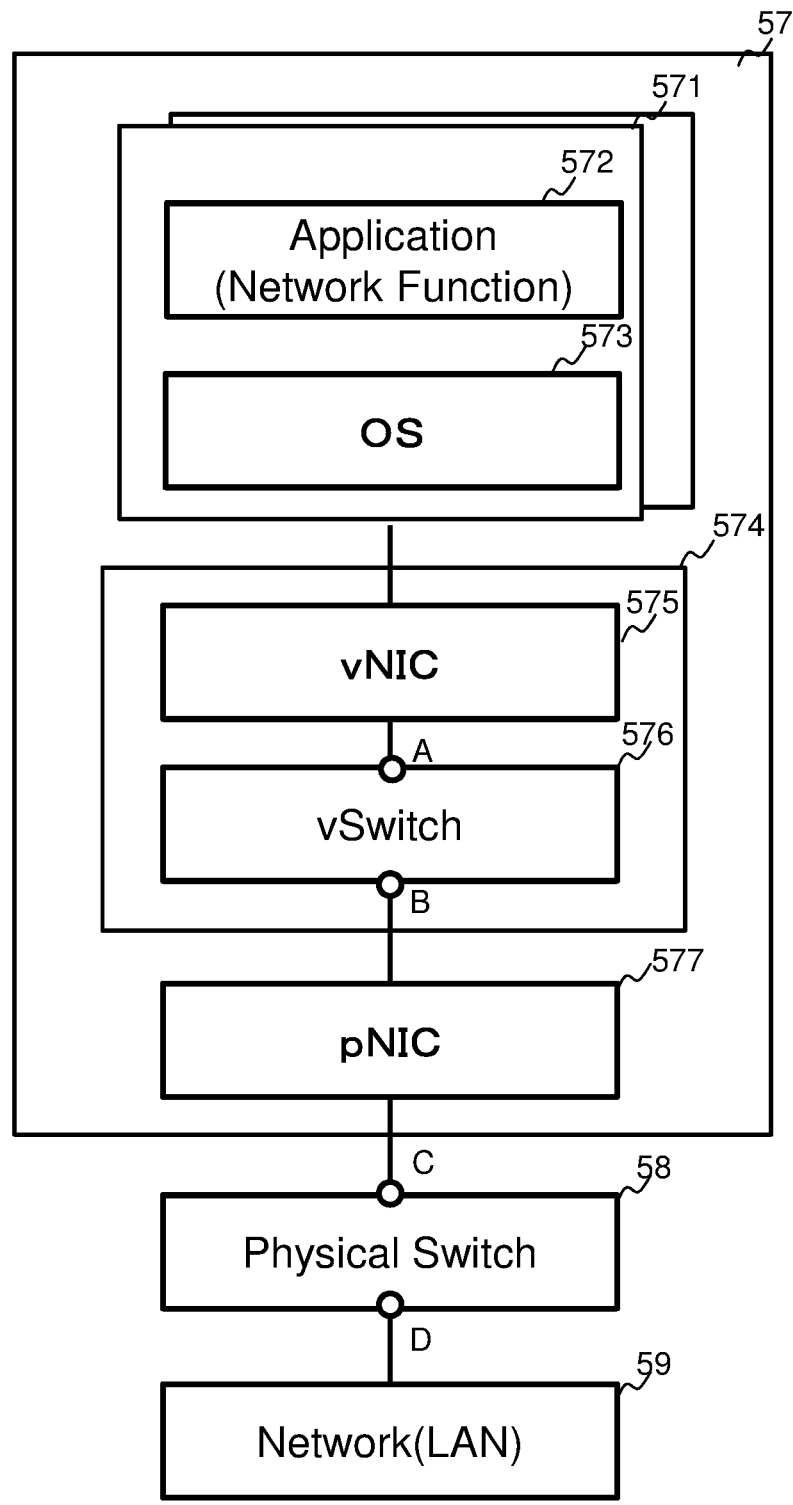
FIG. 12 is a diagram illustrating a configuration of a virtualization apparatus.

The following describes a configuration of the node of vEPC 52 with reference to FIG. 12. A virtual machine (VM) 571 on a server 57 in the data center 50 connects to a virtual port: A of a virtual switch (vSwitch) 576 via a virtual network interface controller (vNIC) 575, and is connected from a virtual port: B of the virtual switch (vSwitch) 576 to a physical port C of a physical switch (Physical Switch) 58 via a physical NIC (pNIC) 577 and is connected to the physical port C of the physical switch 58 through a physical port D of the physical switch 58 to a network (virtual network) 59 such as a LAN. The virtual machine 571 includes a guest OS (Operating System) 573 and an application 572 to realize a part or all of functions of the EPC network node (for example, functions of the ePDG 527 in FIG. 7 or functions of other nodes). The network 59 is connected, for example, to the first gateway (router) 51 in FIG. 7.

A virtual NIC (vNIC), a virtual switch (vSwitch), and the like are provided by a hypervisor 574 which is a virtualization mechanism on the server 57. It is noted that the physical switch 58 may be configured by an L2 (Layer 2) switch and the network 59 may be configured by a virtual network such as a VLAN (Virtual LAN).

Likewise, the filter 54 of FIG. 2 may be implemented by the virtual machine 571 of FIG. 12 and the network 55 of FIG. 2 may be configured by a virtual network 59, such as a VLAN. In FIG. 12, management units of NFV (Network Functions Virtualization) (NFV Orchestrator (NFVO), and VNF (Virtualized Network Function) Manager, or the like), that is a manager that manages and integrates virtualization of network functions are omitted.

Figure 9:
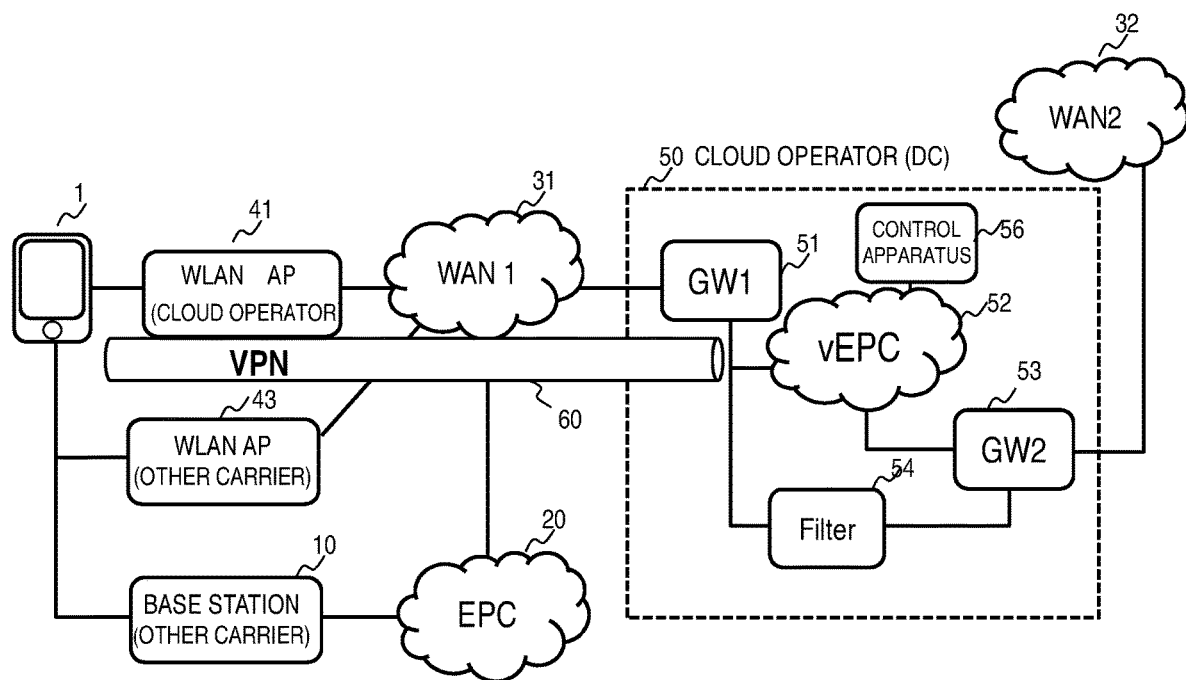
FIG. 9 illustrates another example embodiment of the present invention.

FIG. 9 is a diagram illustrating another example embodiment of the present invention. In the embodiment shown in FIG. 9, the terminal 1 connects via one of a wireless LAN access point 41 provided by a cloud operator possessing the data center 50, a wireless LAN access point 43 provided by another carrier (another carrier) different from the cloud operator 43, a base station 10 of another carrier and an EPC 20 connected with the base station 10 and via the WAN 1 to the data center 50.

In the data center 50, a control apparatus (not shown) (56 in FIG. 6), depending on a network to which the terminal 1 is connected being which one of:

a wireless LAN access point 41 provided to a business entity possessing the data center 50;

a wireless LAN access point 43 provided by another carrier different from the cloud operator of the data center 50, and a base station 10 and the EPC 20 of a communication carrier (another carrier different from the cloud provider), controls charging control method and QoS control in the vEPC 52 to be different from each other.

A QCI (QoS Class Identifier) is used as a parameter of QoS control. QCI of voice call (VoIP) is set to a high value (priority) of 2 in LTE.

Although there is no particular limitation, it is also possible to provide a difference in the following services depending on a network to which the terminal 1 is connected.

When the terminal 1 connects to the wireless LAN access point 41 of the cloud operator and connects to the vEPC 52 of the data center 50, charging for use of the vEPC 52 is not performed (free).

When the terminal 1 connects to the wireless LAN access point 43 of another carrier and connects to the vEPC 52 of the data center 50, predetermined charging for use of the vEPC 52 with setting such as X yen per unit time, for example.

When the terminal 1 connected to the base station 20 of another carrier to connect to the vEPC 52 of the data center 50, predetermined charging with setting such as Y yen (Y>X) per unit time.

Further, as QoS control in the vEPC 52 of the data center 50, when the terminal 1 connects to the wireless LAN access point 41 of the cloud operator to connect to the vEPC 52 of the data center 50, quality is set to high. When the terminal 1 connects to the wireless LAN access point 43 of another carrier to connect to the vEPC 52 of the data center 50, quality is set to low.

When the terminal 1 connects to the base station 20 of another carrier to connect to the vEPC 52 of the data center 50, quality is set to low or intermediate.

Figure 10A:
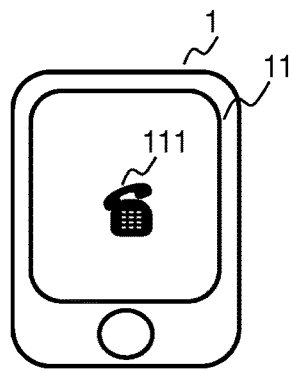
FIG. 10A, FIG. 10B, and FIG. 10C are diagrams illustrating a terminal screen according to an example embodiment of the present invention.
Figure 10B:
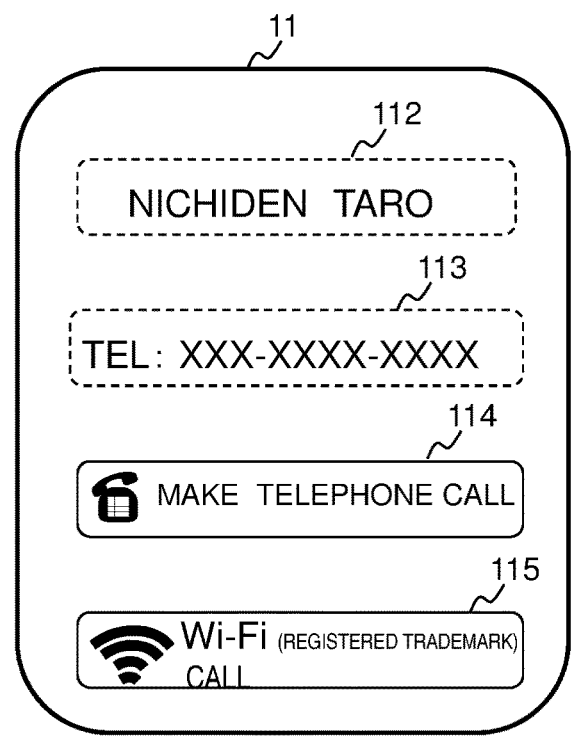
Figure 10C:
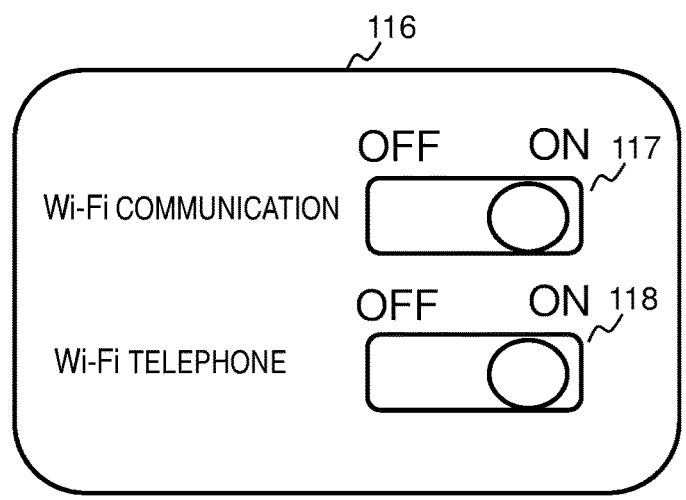

FIGS. 10A to 10C are diagrams for explaining yet another example embodiment of the present invention. Referring to FIG. 10A, in this embodiment, the terminal 1 will be described as a smart apparatus such as a smart phone, a tablet terminal, and the like. It is noted that the terminal 1 may be another type of terminal. For example, it may be a conventional mobile phone (feature phone) that is not a smartphone. The display unit 11 may be a touch panel combining a display apparatus and a position input apparatus such as a touch pad. When a user taps an icon 111 of a receiver (telephone) mark displayed on a home screen of the display unit 11 in FIG. 10A, an application screen is displayed, and when the user taps a phone book icon, a name list is displayed. When a user taps from the list a name of a calling partner to whom the user wishes to make a call: NICHIDEN TARO 112, a telephone number 113 is displayed as shown in FIG. 10B. When the user taps the telephone number 113, a receiver 114 (making a telephone call) and a Wi-Fi (registered trademark) telephone 15 are displayed.

The user makes a call to the other party by selecting either the receiver (making a telephone call) 114 or the Wi-Fi (registered trademark) telephone 115.

When the user taps the receiver (calling) 114, the terminal 1 connects to the base station to connect to the calling partner.

When the user selects the Wi-Fi (registered trademark) telephone 115, the terminal 1 connects to a Wi-Fi (registered trademark) access point and connects to the calling party with Wi-Fi (registered trademark)-Calling (from a wireless LAN via a security gateway to a carrier's switch).

In the example of FIG. 10A and FIG. 10B, a Wi-Fi (registered trademark) telephone is selected when making a call, but as shown in FIG. 10C, on a network setup screen 116 on the display unit 11, on/off 117 of Wi-Fi (registered trademark) communication, on/off 118 of Wi-Fi (registered trademark) telephone may be set. The on/off setting may be a touch type or a slide type.

In FIG. 10B, SMS by Wi-Fi (registered trademark)-Calling may be displayed as one of selection items.

Further, in FIG. 10B, the mark of the Wi-Fi (registered trademark) telephone 115 may be variable so as to represent a received radio wave intensity (electric field intensity) from a Wi-Fi (registered trademark) access point. When the received radio wave intensity (electric field strength) from the Wi-Fi (registered trademark) access point is large, the number of arcs (waves) representing radio waves increases and when the received radio wave tensity (electric field strength) is small, the number of arcs (waves) representing radio waves may be reduced, or a display may be changed.

In the case of setting in advance on a network setting (setup) screen 116, priorities and conditions according to the type of the network to which the terminal is connected may be provided.

Figures 11A, 11B:
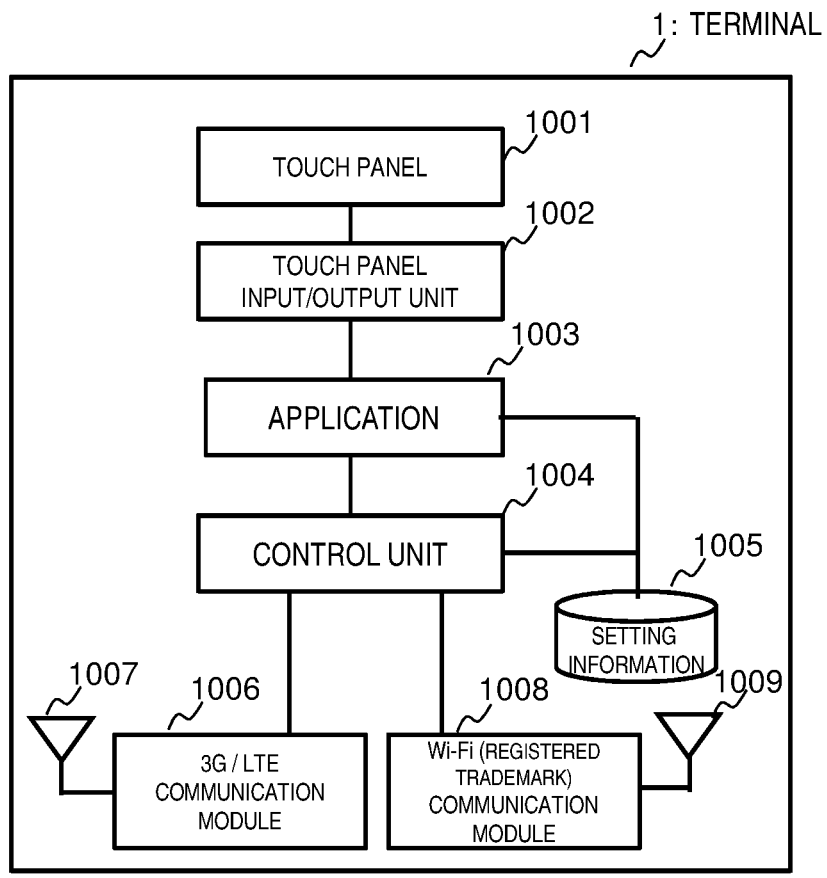
FIG. 11A and FIG. 11B are diagrams illustrating a terminal according to an example embodiment of the present invention.

FIG. 11A is a diagram schematically illustrating a configuration of the terminal 1 described with reference to FIG. 10A to FIG. 10C. Referring to FIG. 11A, the terminal 1 includes a touch panel 1001 for displaying the screen of FIG. 10A to FIG. 10C, a touch panel input and output unit that outputs data and images to the touch panel 1001 and performs position detection of an input to the touch panel 1001, an application (application program) 1003 activated by a tap of the receiver icon 111 (FIG. 10A) to execute a telephone call, a control unit 1004 that establishes a connection with a wireless LAN or a base station based on the processing result of the application 1003, a communication module (3G/LTE communication module) 1006 that communicates with a base station, a Wi-Fi (registered trademark) communication module (IEEE 802.11 a/b/h/n interface) 1008 and an application 1003 (application program) (3G/LTE communication module) 1006 and an antenna 1007 that communicate with the base station, a control unit 1004 that establishes a connection with a wireless LAN or a base station based on the processing result in the Wi-Fi) communication module (IEEE 802.11 a/b/h/n interface) 1008 and an antenna 1009. Processing of the application 1003, the control unit 1004 may be realized by a program executed by a CPU (Central Processing Unit) (not shown) of the terminal 1.

The communication module 1006 or the communication module 1008 may be selected in response to a change in the connection destination network from the terminal 1 or the like at the start of the call, as illustrated in FIG. 10A and FIG. 10B. That is, in a case where the setting information is not stored in the storage unit 1005, the application 1003 determines which one of the telephone (3GPP access network telephone or Wi-Fi (registered trademark) phone) is selected on the touch panel 1001 The control unit 1004 selects the communication module 1006 or the communication module 1008 and communicates with the base station or the Wi-Fi (registered trademark) access point.

On the other hand, when the setting information as shown in FIG. 11B is preset in the storage unit 1005, when the user taps the telephone number (113 in FIG. 10B) of a call partner to whom the user makes a phone call, the application 1003 selects a Wi-Fi (registered trademark) telephone to connect to a Wi-Fi (registered trademark) access point (wireless LAN access point) from the Wi-Fi (registered trademark) communication module 1008 and the antenna 1009 by the control 1004. In FIG. 11A, the control unit 1004 stores the setting information (FIG. 101) input from the setup screen 116 of FIG. 10C in the storage unit 1005. The on/off of the Wi-Fi (registered trademark) telephone may all the time be performed from the setup screen 116 of FIG. 10C.

According to each of the embodiments described above, it is possible to provide a secure network connection to a terminal accessing the data center via the wireless LAN, the WAN 1, and to provide to Wi-Fi (registered trademark)-Calling from the terminal communication services (charging, communication quality) according to the network type to which the terminal connects. In addition, it enables protection from harmful sites, denial of harmful contents and rejection of improper incoming calls, etc.

The disclosure of the above Non-Patent Literature 1 is incorporated herein by reference. Within the framework of the entire disclosure (including the scope of claims) of the present invention, it is possible to change/adjust the embodiment or example based on the basic technical concept. Also, various combinations or selections of various disclosed elements (including each element of each claim, each element of each embodiment, each element of each drawing, etc.) are possible within the scope of the claims of the present invention. That is, it goes without saying that the present invention includes various modifications and modifications that could be made by those skilled in the art according to the entire disclosure including the claims, and technical concepts.

The above-described embodiments may be attached, for example, as follows (but not limited to the following).

Supplementary Note 1

A communication system including
a data center adapted to connect via a first wide area network to a core network connected with a base station and to a wireless LAN (Local Area Network), wherein the data center includes:
a virtual core network that virtualizes at least a part of functions of the core network and is adapted to connect to the first wide area network; and
a control apparatus that variably controls a service provided by the virtual core network to a terminal enabled to select connection to either the wireless LAN or the base station, and that connects to the data center, in accordance with a network connected between the terminal and the first wide area network.

Supplementary Note 2

The communication system according to supplementary note 1, wherein in the data center, in accordance with a type of a network to which the terminal connects, the type of the network corresponding to whether the terminal connects to the data center via the base station and the core network and via the first wide area network, or the terminal connects to the data center via the wireless LAN and the first wide area network, and in a case where the terminal connects to the data center via the wireless LAN and the first wide area network, in accordance with a type of the wireless LAN to which the terminal connects, the type of the wireless LAN corresponding to whether an access point of the wireless LAN is provided by an operator of the data center, or by another operator that is different from the operator of the data center, the control apparatus variably controls at least one of a charging method and a communication quality service provided to the terminal in the virtual core network.

Supplementary Note 3

The communication system according to supplementary note 1 or 2, wherein the data center includes a VPN apparatus that, in a case where the terminal connects to the data center via the wireless LAN and via the first wide area network, connects to the terminal by a VPN (Virtual Private Network) extending through the first wide area network and the wireless LAN.

Supplementary Note 4

The communication system according to supplementary note 3, wherein the data center comprises:

a first gateway that is adapted to connect to the first wide area network and that includes the VPN apparatus;

a second gateway that is adapted to connect to a second wide area network, wherein the first gateway and the second gateway are connected to the virtual core network; and a filter that is arranged between the first gateway and the second gateway and that performs filtering of at least one of a packet input thereto from the first wide area network and a packet input thereto from the second wide area network.

Supplementary Note 5

The communication system according to supplementary note 4, wherein in the data center, the filter controls access denial or permission of an incoming call and a message destined to the terminal from the second wide area network side.

Supplementary Note 6

The communication system according to any one of supplementary notes 3 to 5, wherein the terminal communicates from the VPN via the VPN apparatus and the virtual core network and via the second wide area network with a connection destination, and the terminal receives, through the VPN, an incoming call or data destined to the terminal from the second wide area network from the virtual core network and the VPN apparatus in the data center.

Supplementary Note 7

The communication system according to any one of supplementary notes 3 to 6, wherein the VPN apparatus of the data center manages the VPN between the terminal and the VPN apparatus, on a per terminal basis or on a per terminal user basis.

Supplementary Note 8

The communication system according to any one of supplementary notes 1 to 7, wherein the terminal comprises a selector that selects to communicate either via the base station or via the wireless LAN.

Supplementary Note 9

The communication system according to any one of supplementary notes 1 to 8, wherein an access point of the wireless LAN includes at least one of an access point provided by an operator of the data center, and an access point provided by another communication carrier.

Supplementary Note 10

A communication apparatus comprising:

an apparatus adapted to connect via a first wide area network to a core network connected with a base station and to a wireless LAN (Local Area Network);

a virtual core network that virtualities at least a part of functions of the core network and is adapted to connect to the first wide area network; and a control apparatus that variably controls a service provided by the virtual core network to a terminal enabled to select connection to either the wireless LAN or the base station and connect to the data center, in accordance with a network connected between the terminal and the first wide area network.

Supplementary Note 11

The communication apparatus according to supplementary note 10, wherein the control apparatus variably controls at least one of a charging method and a communication quality service provided to the terminal in the virtual core network, in accordance with a type of a network to which the terminal connects, the type of the network corresponding to whether the terminal connects to the data center via the base station and the core network and via the first wide area network, or the terminal connects to the data center via the wireless LAN and the first wide area network, and in a case where the terminal connects to the data center via the wireless LAN and the first wide area network, in accordance with a type of the wireless LAN to which the terminal connects, the type of the wireless LAN corresponding to whether an access point of the wireless LAN is provided by an operator of the data center, or by another operator that is different from the operator of the data center.

Supplementary Note 12

The communication apparatus according to supplementary note 10 or 11, comprising a VPN apparatus that, in a case where the terminal connects to the data center via the wireless LAN and via the first wide area network, connects to the terminal by a VPN (Virtual Private Network) extending through the first wide area network and the wireless LAN.

Supplementary Note 13

The communication apparatus according to supplementary note 12, comprising:
a first gateway that is adapted to connect to the first wide area network and that includes the VPN apparatus;
a second gateway that is adapted to connect to a second wide area network, wherein the first gateway and the second gateway are connected to the virtual core network; and
a filter that is arranged between the first gateway and the second gateway and that performs filtering of at least one of a packet input thereto from the first wide area network and a packet input thereto from the second wide area network.

Supplementary Note 14

The communication apparatus according to supplementary note 13, wherein the filter controls access denial or permission of an incoming call and a message destined to the terminal from the second wide area network side.

Supplementary Note 15

The communication apparatus according to any one of supplementary notes 12 to 14, wherein the terminal communicates from the VPN via the VPN apparatus and the virtual core network and via the second wide area network with a connection destination, and
the terminal receives, through the VPN, an incoming call or data destined to the terminal from the second wide area network from the virtual core network and the VPN apparatus in the data center.

Supplementary Note 16

The communication apparatus according to any one of supplementary notes 10 to 15, wherein the VPN apparatus of the data center manages the VPN between the terminal and the VPN apparatus, on a per terminal basis or on a per terminal user basis.

Supplementary Note 17

A communication method by a data center that is adapted to connect to a core network connected with a base station and to a wireless LAN (Local Area Network) through a first wide area network (Wide Area Network),
providing a virtual core network that virtualizes at least a part of functions of the core network and is adapted to connect to the first wide area network; and
variably controlling a service provided by the virtual core network to a terminal enabled to select connection to either the wireless LAN or the base station, and that connects to the data center, in accordance with a network connected between the terminal and the first wide area network.

Supplementary Note 18

The communication method according to supplementary note 17, comprising
variably controlling, in the data center, at least one of a charging method and a communication quality service provided to the terminal in the virtual core network, in accordance with a type of a network to which the terminal connects, the type of the network corresponding to whether the terminal connects to the data center via the base station and the core network and via the first wide area network, or the terminal connects to the data center via the wireless LAN and the first wide area network, and
in a case where the terminal connects to the data center via the wireless LAN and the first wide area network, in accordance with a type of the wireless LAN to which the terminal connects, the type of the wireless LAN corresponding to whether an access point of the wireless LAN is provided by an operator of the data center, or by another operator that is different from the operator of the data center.

Supplementary Note 19

The communication method according to supplementary note 17 or 18, wherein in a case where the terminal connects to the data center via the wireless LAN and via the first wide area network, connection between the terminal and the data center by a VPN (Virtual Private Network) extending through the first wide area network and the wireless LAN.

Supplementary Note 20

The communication method according to supplementary note 19, wherein in the data center are provided:
a first gateway connecting to the first wide area network;
a second gateway adapted to connect to a second wide area network, wherein the first gateway and the second gateway are connected to the virtual core network; the method comprising
by a filter that is arranged between the first gateway and the second gateway, performing filtering of at least one of a packet input thereto from the first wide area network and a packet input thereto from the second wide area network.

Supplementary Note 21

The communication method according to supplementary note 20, comprising
controlling by the filter access denial or permission of an incoming call and a message destined to the terminal from the second wide area network side.

Supplementary Note 22

The communication method according to any one of supplementary notes 19 to 21, comprising:
the terminal communicating with the connection destination from the VPN via the VPN apparatus and the virtual core network via the second wide area network, and
the terminal receiving from the virtual core network and the VPN apparatus in the data center via the VPN an incoming call or data destined to the terminal from the second wide area network side.

Supplementary Note 23

The communication method according to any one of supplementary notes 19 to 22, comprising
the VPN apparatus of the data center managing the VPN between the terminal and the VPN apparatus, on a per terminal basis or on a per terminal user basis.

Supplementary Note 24

A terminal comprising:
a communicator for communicating with a base station of a mobile network or a wireless LAN (Local Area Network); and a selector being able to select whether to make a call via the base station of the mobile network or to make a call via the wireless LAN, when originating a call.

Supplementary Note 25

A terminal comprising:
a communicator for communicating with a base station of a mobile network or a wireless LAN (Local Area Network); and
an application selector being able to select whether to make a call via the base station of the mobile network or to make a call via the wireless LAN, when originating a call.

Supplementary Note 26

A terminal comprising:
a communicator for communicating with a base station of a mobile network or a wireless LAN (Local Area Network); and
a selector being able to select, at a setup, whether to make a call via the base station of the mobile network or to make a call via the wireless LAN.

Supplementary Note 27

The terminal according to any one of supplementary notes 24 to 26, comprising:
a connector that when connecting to a data center via the wireless LAN and the first wide area network, connects between the terminal and the data center with a VPN through the wireless LAN and the first wide area network.

Supplementary Note 28

A non-transitory computer readable medium storing therein a program causing a computer arranged in a data center adapted to connect via a first wide area network to a core network connected with a base station and to a wireless LAN (Local Area Network) to execute processing comprising;
operating a virtual core network that virtualizes at least a part of functions of the core network and is adapted to connect to the first wide area network; and
variably controlling a service provided by the virtual core network to a terminal enabled to select connection to either the wireless LAN or the base station and connect to the data center, in accordance with a network connected between the terminal and the first wide area network.

Supplementary Note 29

The non-transitory computer readable medium according to supplementary note 28, the program stored therein casing the computer to execute processing that variably controls at least one of a changing method and a communication quality service provided to the terminal in the virtual core network,
in accordance with a type of a network to which the terminal connects, the type of the network corresponding to whether the terminal connects to the data center via the base station and the core network and via the first wide area network, or the terminal connects to the data center via the wireless LAN and the first wide area network, and
in a case where the terminal connects to the data center via the wireless LAN and the first wide area network, in accordance with a type of the wireless LAN to which the terminal connects,
the type of the wireless LAN corresponding to whether an access point of the wireless LAN is provided by an operator of the data center, or by another operator that is different from the operator of the data center.

Supplementary Note 30

The non-transitory computer readable medium according to supplementary note 28 or 29, the program stored therein casing the computer to execute
processing that in a case where the terminal connects to the data center via the wireless LAN and via the first wide area network, connects to the terminal by a VPN (Virtual Private Network) extending through the first wide area network and the wireless LAN.

Supplementary Note 31

A non-transitory computer readable medium storing therein a program causing a computer included in a terminal to execute processing comprising:
communicating with a base station of a mobile network or a wireless LAN (Local Area Network); and
enabling to select whether to make a call via the base station of the mobile network or to make a call via the wireless LAN, when originating a call.

Supplementary Note 32

A non-transitory computer readable medium storing therein a program causing a computer included in a terminal to execute processing comprising:
communicating with a base station of a mobile network or a wireless LAN (Local Area Network); and
enabling to select, at a setup, whether to make a call via the base station of the mobile network or to make a call via the wireless LAN.

The invention claimed is:
1. A communication system comprising:
a data center adapted to connect via a first wide area network to a core network connected with a base station and to a wireless LAN (Local Area Network),
wherein the data center includes:
a virtual core network that virtualizes at least a part of functions of the core network and is adapted to connect to the first wide area network; and
a control apparatus that controls communication from a terminal, the terminal enabled to select connection to the wireless LAN or connection to the base station, according to a connection request received at the terminal by a user input,
wherein in the data center, in accordance with a type of a network to which the terminal connects, the type of the network corresponding to whether the terminal connects to the data center via the base station and the core network and via the first wide area network, or the terminal connects to the data center via the wireless LAN and the first wide area network, and
in a case where the terminal connects to the data center via the wireless LAN and the first wide area network,
in accordance with a type of the wireless LAN to which the terminal connects, the type of the wireless LAN corresponding to whether an access point of the wireless LAN is provided by an operator of the data center, or by another operator that is different from the operator of the data center,
the control apparatus controls at least one of a charging method and a communication quality service provided to the terminal in the virtual core network.

2. The communication system according to claim 1, wherein the data center comprises:
  a VPN apparatus that, in a case where the terminal connects to the data center via the wireless LAN and via the first wide area network, connects to the terminal by a VPN (Virtual Private Network) extending through the first wide area network and the wireless LAN;
  a first gateway that is adapted to connect to the first wide area network and that includes the VPN apparatus; and
  a second gateway that is adapted to connect to a second wide area network, wherein the first gateway and the second gateway are connected to the virtual core network.

3. The communication system according to claim 2, wherein in the data center, a filter controls access denial or permission of an incoming call and a message destined to the terminal from the second wide area network side.

4. The communication system according to claim 2, wherein the terminal communicates from the VPN via the VPN apparatus and the virtual core network and via the second wide area network with a connection destination, and
  the terminal receives, from the virtual core network and the VPN apparatus in the data center and through the VPN, an incoming call or data destined to the terminal from the second wide area network.

5. The communication system according to claim 2, wherein the VPN apparatus of the data center manages the VPN between the terminal and the VPN apparatus, on a per terminal basis or on a per terminal user basis.

6. The communication system according to claim 2, wherein the data center further comprises:
  a filter that is arranged between the first gateway and the second gateway and that performs filtering of at least one of a packet input thereto from the first wide area network and a packet input thereto from the second wide area network.

7. The communication system according to claim 1, wherein the terminal comprises
  a selector that selects to communicate via the base station or via the wireless LAN.

8. The communication system according to claim 1, wherein an access point of the wireless LAN includes at least one of
  an access point provided by an operator of the data center, and
  an access point provided by another communication carrier.

9. A communication apparatus comprising:
  an apparatus configured to communicate with a terminal via a first wide area network, the first wide area network connected to a wireless LAN (Local Area Network), a base station and a core network;
  a virtual core network that virtualizes at least a part of functions of the core network and is adapted to connect to the first wide area network; and
  a control apparatus that controls communication from a terminal, the terminal enabled to select connection to the wireless LAN or connection to the base station, according to a connection request received at the terminal by a user input,
  wherein the control apparatus controls at least one of a charging method and a communication quality service provided to the terminal in the virtual core network,
  in accordance with a type of a network to which the terminal connects, the type of the network corresponding to whether the terminal connects to a data center via the base station,
  and the core network and via the first wide area network, or the terminal connects to the data center via the wireless LAN and the first wide area network, and
  in a case where the terminal connects to the data center via the wireless LAN and the first wide area network,
  in accordance with a type of the wireless LAN to which the terminal connects, the type of the wireless LAN corresponding to whether an access point of the wireless LAN is provided by an operator of the data center, or by another operator that is different from the operator of the data center.

10. The communication apparatus according to claim 9, comprising
  a VPN apparatus that, in a case where the terminal connects to a data center via the wireless LAN and via the first wide area network, connects to the terminal by a VPN (Virtual Private Network) extending through the first wide area network and the wireless LAN.

11. The communication apparatus according to claim 10, comprising:
  a first gateway that is adapted to connect to the first wide area network and that includes the VPN apparatus;
  a second gateway that is adapted to connect to a second wide area network, wherein the first gateway and the second gateway are connected to the virtual core network; and
  a filter that is arranged between the first gateway and the second gateway and that performs filtering of at least one of a packet input thereto from the first wide area network and a packet input thereto from the second wide area network.

12. The communication apparatus according to claim 11, wherein the filter controls access denial or permission of an incoming call and a message destined to the terminal from the second wide area network side.

13. The communication apparatus according to claim 10, wherein the terminal communicates from the VPN via the VPN apparatus and the virtual core network and via a second wide area network with a connection destination, and
  the terminal receives, from the virtual core network and the VPN apparatus in the data center and through the VPN, an incoming call or data destined to the terminal from the second wide area network.

14. The communication apparatus according to claim 10, wherein the VPN apparatus of the data center manages the VPN between the terminal and the VPN apparatus, on a per terminal basis or on a per terminal user basis.

15. A communication method by a data center that is adapted to connect to a core network connected with a base station and to a wireless LAN (Local Area Network) through a first wide area network (Wide Area Network), the method comprising:
  providing a virtual core network that virtualizes at least a part of functions of the core network and is adapted to connect to the first wide area network; and
  controlling communication from a terminal, the terminal enabled to select connection to the wireless LAN or connection to the base station, according to a connection request received at the terminal by a user input, the method further comprising:
  controlling, in the data center, at least one of a charging method and a communication quality service provided to the terminal in the virtual core network, in accordance with a type of a network to which the terminal connects, the type of the network corresponding to whether the terminal connects to the data center via the base station and the core network and via the first wide area network, or the terminal connects to the data center via the wireless LAN and the first wide area network, and in a case where the terminal connects to the data center via the wireless LAN and the first wide area network, in accordance with a type of the wireless LAN to which the terminal connects, the type of the wireless LAN corresponding to whether an access point of the wireless LAN is provided by an operator of the data center, or by another operator that is different from the operator of the data center.

16. A non-transitory computer-readable medium-storing therein a program causing a computer arranged in a data center adapted to connect via a first wide area network to a core network connected with a base station and to a wireless LAN (Local Area Network) processing comprising:

operating a virtual core network that virtualizes at least a part of functions of the core network and is adapted to connect to the first wide area network; and controlling communication from a terminal, the terminal enabled to select connection to the wireless LAN or connection to the base station, according to a connection request received at the terminal by a user input, wherein the program casing the computer to execute processing that controls at least one of a charging method and a communication quality service provided to the terminal in the virtual core network, in accordance with a type of a network to which the terminal connects, the type of the network corresponding to whether the terminal connects to the data center via the base station and the core network and via the first wide area network, or the terminal connects to the data center via the wireless LAN and the first wide area network, and in a case where the terminal connects to the data center via the wireless LAN and the first wide area network, in accordance with a type of the wireless LAN to which the terminal connects, the type of the wireless LAN corresponding to whether an access point of the wireless LAN is provided by an operator of the data center, or by another operator that is different from the operator of the data center.

* * * * *